(12) United States Patent
Enning et al.

(10) Patent No.: US 12,065,110 B2
(45) Date of Patent: Aug. 20, 2024

(54) USE OF A SUCTION-CLEANING ATTACHMENT OF A CLEANING DEVICE FOR CLEANING THE INTERIOR OF MOTOR VEHICLES

(71) Applicant: Mr. Wash Autoservice AG, Essen (DE)

(72) Inventors: Richard Enning, Mülheim (DE); Cornelis van de Pol, Hagen (DE)

(73) Assignee: Mr. Wash Autoservice AG, Essen (DE)

( * ) Notice: Subject to any disclaimer, the term of this patent is extended or adjusted under 35 U.S.C. 154(b) by 599 days.

(21) Appl. No.: 17/414,174

(22) PCT Filed: Apr. 15, 2019

(86) PCT No.: PCT/EP2019/059699
§ 371 (c)(1),
(2) Date: Jun. 15, 2021

(87) PCT Pub. No.: WO2020/211925
PCT Pub. Date: Oct. 22, 2020

(65) Prior Publication Data
US 2022/0041140 A1 Feb. 10, 2022

(51) Int. Cl.
*B60S 3/00* (2006.01)
*A47L 5/38* (2006.01)
(Continued)

(52) U.S. Cl.
CPC ........... *B60S 3/008* (2013.01); *A47L 5/38* (2013.01); *A47L 7/0076* (2013.01); *A47L 9/08* (2013.01); *A47L 9/248* (2013.01)

(58) Field of Classification Search
CPC .......... B60S 3/008; A47L 5/38; A47L 7/0076; A47L 9/08; A47L 9/248
See application file for complete search history.

(56) References Cited

U.S. PATENT DOCUMENTS

| 3,525,118 A | 8/1970 | Viollet |
| 2017/0325644 A1 | 11/2017 | Muyters |

FOREIGN PATENT DOCUMENTS

| FR | 2867052 A1 | 9/2005 |
| KR | 20140003023 U | 5/2014 |

OTHER PUBLICATIONS

International Search Report and Written Opinion issued in corresponding PCT Application No. PCT/EP2019/059699, mailed Dec. 12, 2019.

(Continued)

*Primary Examiner* — David Redding
(74) *Attorney, Agent, or Firm* — Andrus Intellectual Property Law, LLP

(57) ABSTRACT

The invention relates to the use of a suction-cleaning attachment of a cleaning device for cleaning the interior of motor vehicles by means of a suction airflow, having a housing which has a suction duct for conducting the suction airflow, there being in the housing in addition to the suction duct a compressed air duct for conducting a compressed airflow, and/or the housing being assigned in addition to the suction duct a compressed air duct for conducting a compressed airflow, and a grip region for gripping the suction-cleaning attachment with one hand being provided on the outside of the housing. According to the invention, a switch for controlling the compressed airflow is provided, and the switch is arranged on the grip region such that the switch can be operated by the hand holding the grip region.

21 Claims, 20 Drawing Sheets

(51) Int. Cl.
*A47L 7/00* (2006.01)
*A47L 9/08* (2006.01)
*A47L 9/24* (2006.01)

(56) References Cited

OTHER PUBLICATIONS

International Preliminary Examination Report issued in corresponding PCT Application No. PCT/EP2019/059699, mailed Mar. 22, 2021.

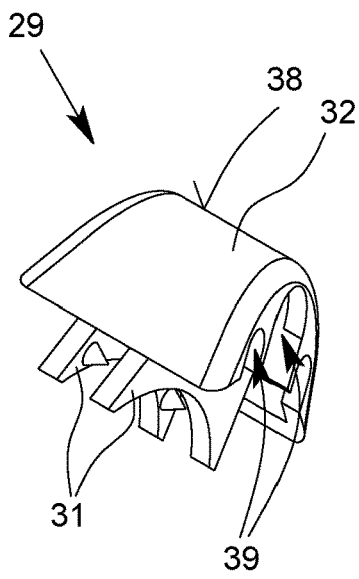 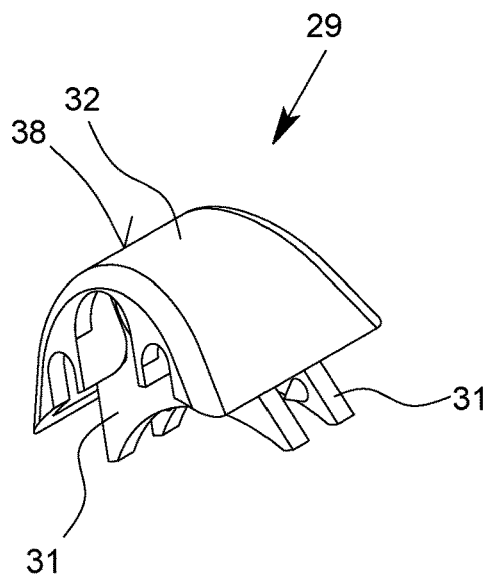
Fig. 8          Fig. 9
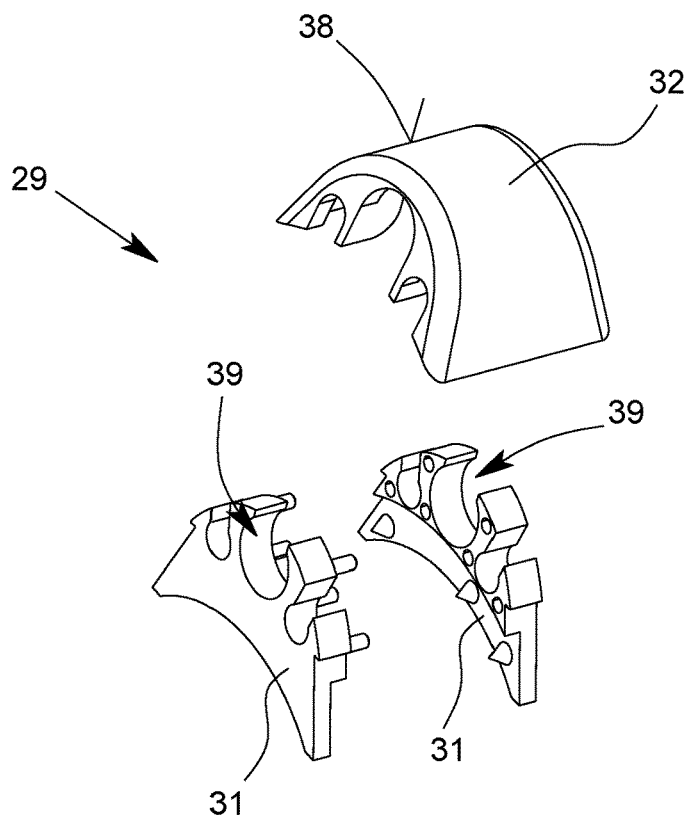
Fig. 10

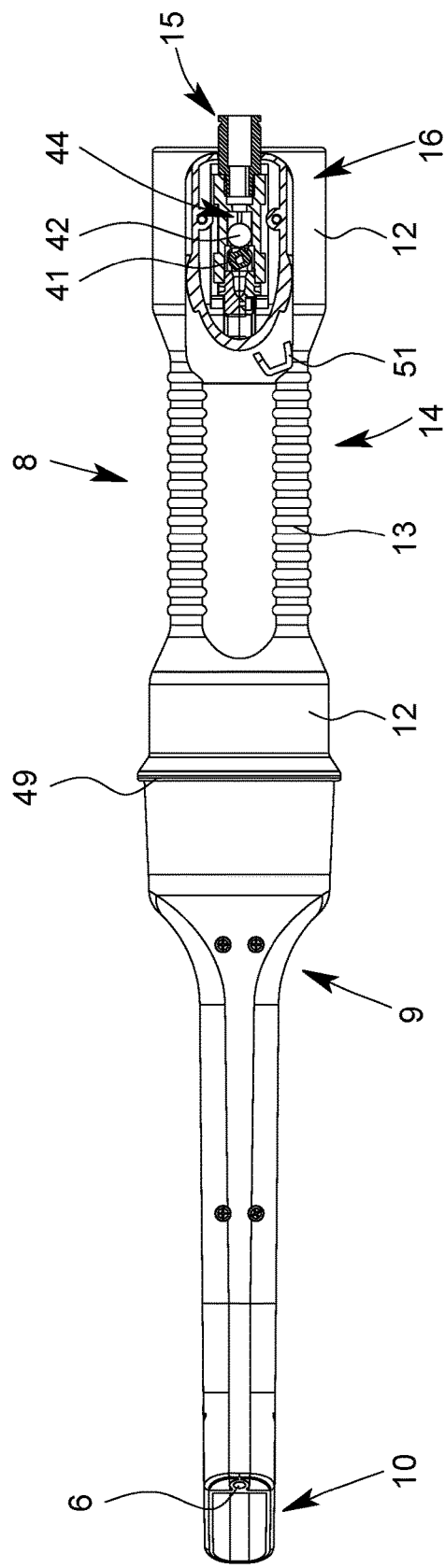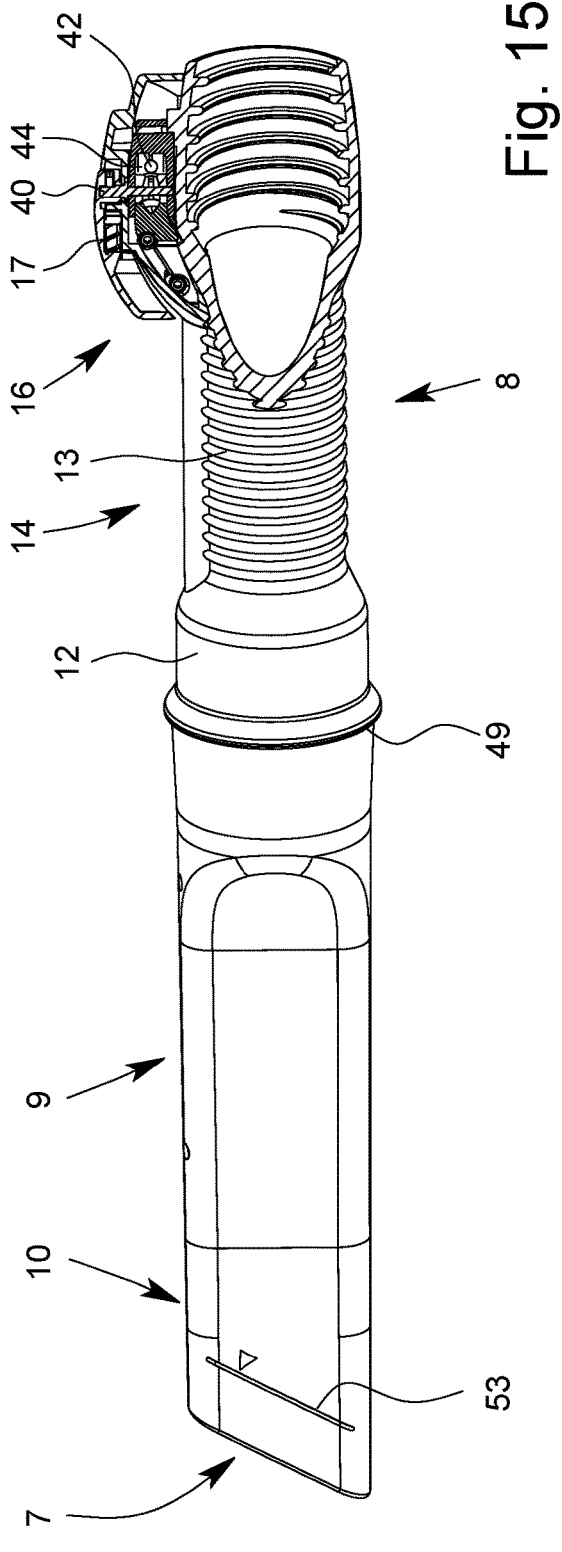

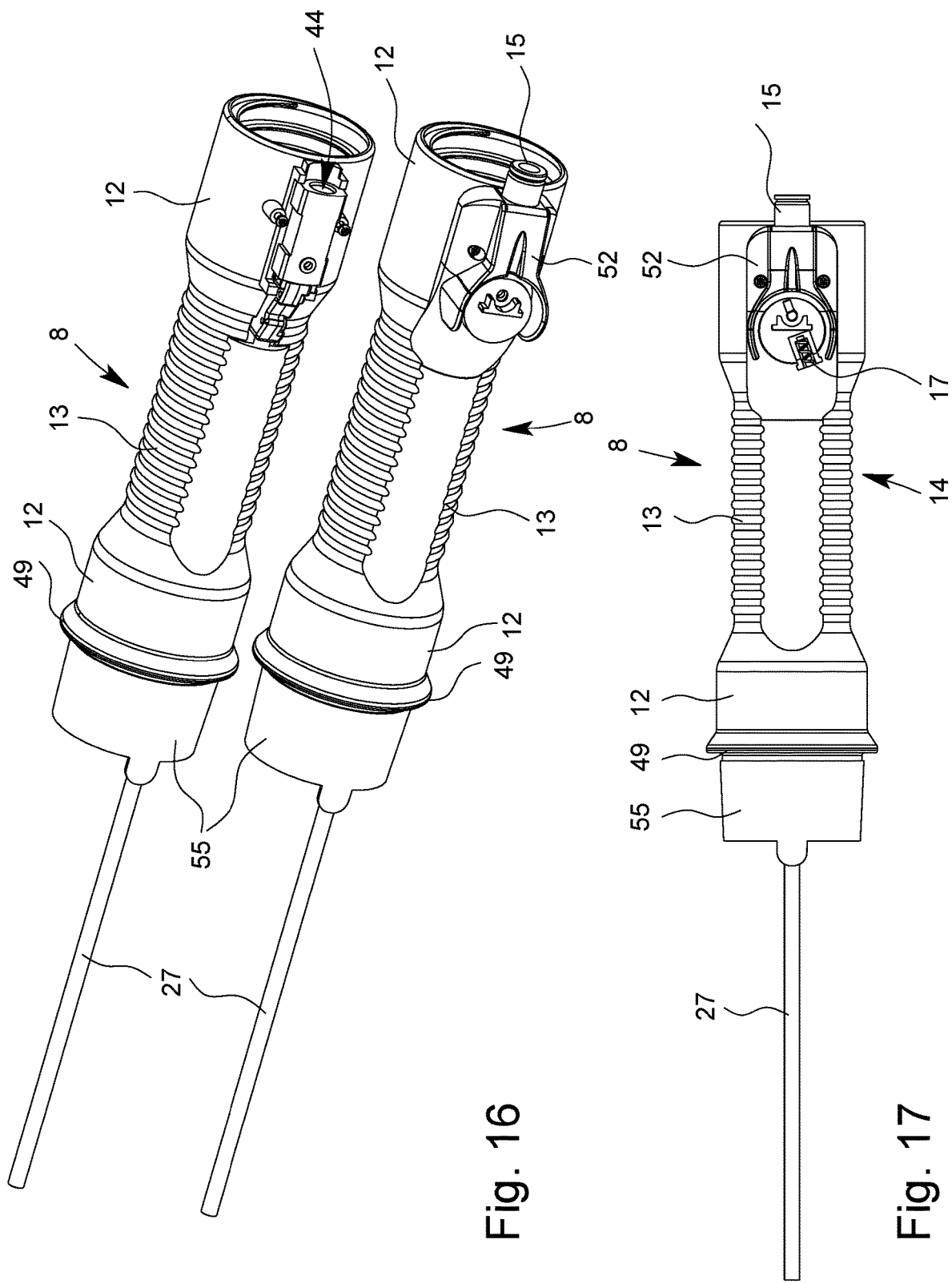

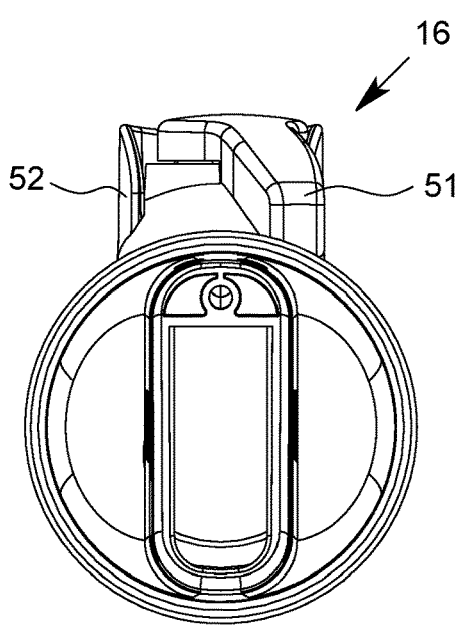
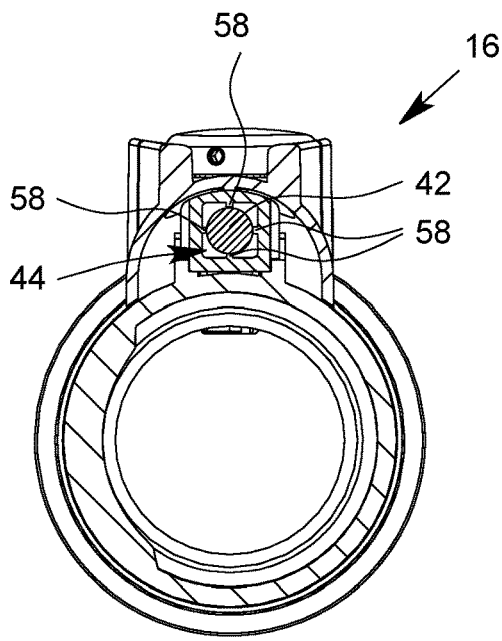
Fig. 18    Fig. 19
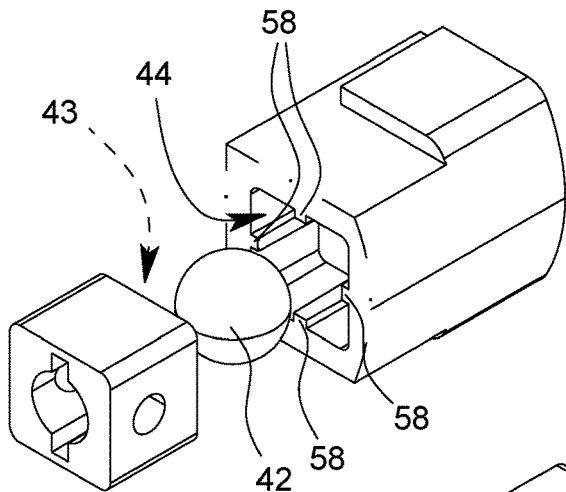
Fig. 20
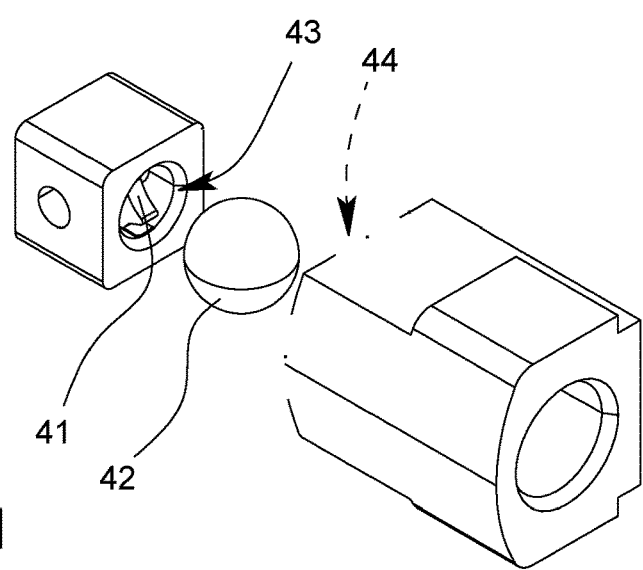
Fig. 21

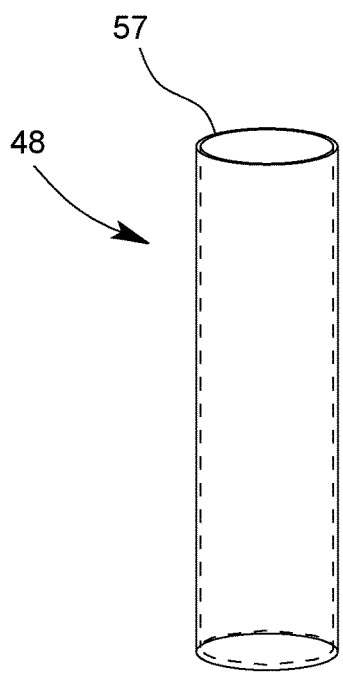
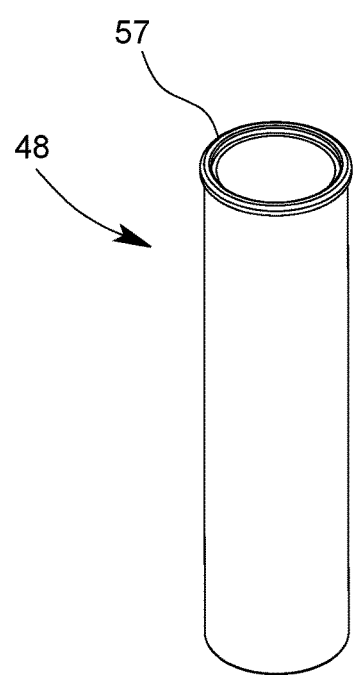
Fig. 28A  Fig. 28B
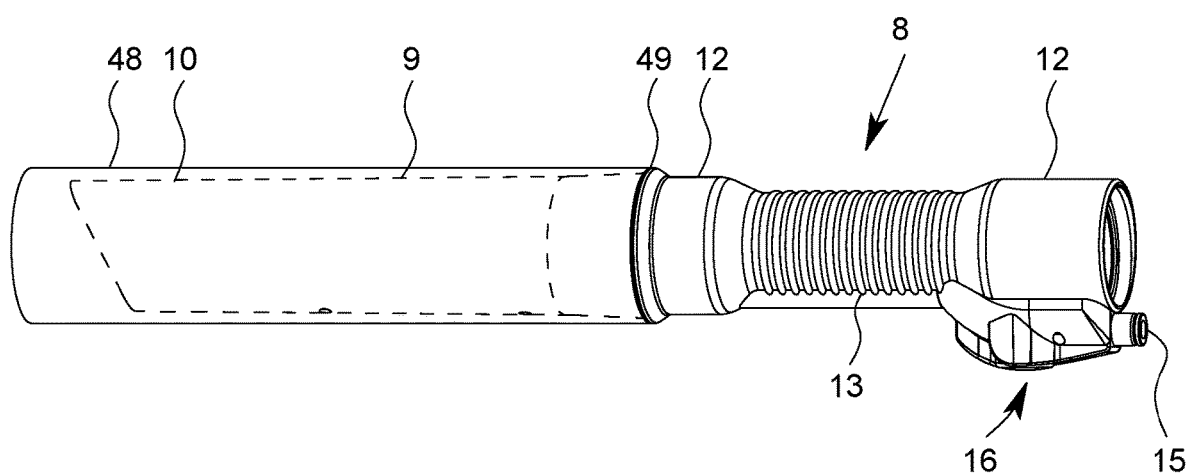
Fig. 29

USE OF A SUCTION-CLEANING ATTACHMENT OF A CLEANING DEVICE FOR CLEANING THE INTERIOR OF MOTOR VEHICLES

CROSS-REFERENCE TO RELATED APPLICATIONS

This application is the U.S. national stage application of International Application PCT/EP2019/059699, filed Apr. 15, 2019, which International Application was published on Oct. 22, 2020, as International Publication WO 2020/211925 in the German language. The International Application is hereby incorporated herein by reference, in its entirety.

FIELD

The invention relates to the use of a suction cleaning attachment of a cleaning device for the interior cleaning of motor vehicles by means of a suction air flow, with a housing having a suction channel for guiding the suction air flow.

BACKGROUND

Cleaning devices of the aforementioned type are also referred to as car vacuum cleaners, which are usually used in the commercial sector, wherein dirt and/or particles are sucked out of the interior of the vehicle by means of the suction cleaning attachment and/or the vacuum nozzle. The cleaning attachment is usually designed in such a way that dirt and/or particles can be sucked up from a substrate, for example the seats and/or the floor mats.

However, problems arise in practice when cleaning the interior of motor vehicles. In the vehicle interior, many areas are not accessible at all or only with difficulty during cleaning, so that these areas also cannot be cleaned or cannot be cleaned sufficiently. This applies, for example, to the area between the car seats, but also to areas that are angled or difficult to access. Accordingly, no efficient extraction of dirt particles is possible in the aforementioned areas.

In the prior art, in order to improve the interior cleaning of motor vehicles, it is provided that a compressed air channel for guiding a compressed air flow is provided in the housing in addition to the suction channel and/or that a compressed air channel for guiding a com-pressed air flow is assigned to the housing in addition to the suction channel.

The fact that the compressed air channel is assigned to the housing is to be understood in particular in such a way that the compressed air channel does not run in the housing of the suction cleaning attachment, but is provided on the outside of the housing, for example, but is then preferably firmly connected to the housing. The outlet of the compressed air from the compressed air channel is in particular jet-shaped, so that the compressed air jet or the compressed air flow can be directed in a targeted and purposeful manner to an area to be cleaned, in particular an area that is difficult to access. The compressed air flow can be switched on as required during suction operation and then used simultaneously with the suction air flow for cleaning the interior of motor vehicles.

In the prior art, therefore, a combination of a compressed air flow and a suction air flow, both of which preferably emerge from the suction cleaning attachment according to the invention in the front area, is known. The compressed air flow is thereby provided for whirling up particles and/or dirt, in particular dust particles, at areas that are difficult to access. Thus, the compressed air can be directed specifically to areas that are difficult to access and whirl up the dirt particles in these areas, which can then be extracted by the suction air flow. The dirt particles can be transported by means of compressed air from areas that are difficult to access, in particular crevices, recesses and/or slots, into open areas and/or areas that are accessible to the suction air flow and/or the suction cleaning attachment, wherein the dirt particles can be extracted in these areas. This significantly increases the cleaning efficiency of the cleaning device compared to "pure" suction operation, since cleaning can be ensured not only in easily accessible areas in the vehicle interior, but also in areas that cannot be reached directly with the mouth of the suction cleaning attachment.

The compressed air channel can be designed independently of the suction channel. Both channels ultimately run separately from each other, as the suction operation and the com-pressed air operation can take place simultaneously. The suction operation and the com-pressed air operation are thus decoupled from each other. However, the respective outlet openings from the respective channels for the com-pressed air flow and the suction air flow can be provided at least substantially in a common plane. In particular, the suction air and the compressed air exit at the front mouth of the suction cleaning attachment.

The advantage of the above-mentioned suction cleaning attachment is that it can be connected to existing cleaning devices, in particular car vacuum cleaners.

The disadvantage of the aforementioned prior art suction cleaning attachment is that it is comparatively unwieldy and ultimately difficult to operate. The compressed air flow has to be switched on in such a way that the suction cleaning attachment has to be gripped. To switch on the compressed air operation, actuating devices are provided in the prior art which require another hand and/or another operator. The actuation must be performed with both hands.

In the known suction cleaning attachment, a handle area is provided on the outside of the housing for gripping the suction cleaning attachment with one hand. During suction operation, the suction cleaning attachment is grasped by the hand of a user, at least in some areas of the handle area, so that the suction cleaning attachment can be held and guided. Ultimately, however, the other hand must be used and/or the suction operation or extraction must be interrupted in order to switch on the compressed air operation.

Consequently, the activation of the compressed air operation in the prior art can only be carried out with a comparatively high effort, which finally also increases the time required for the interior cleaning of motor vehicles and can also lead to the fact that the advantageous compressed air flow described above is only rarely used for the interior cleaning of motor vehicles, with the result that the cleaning result suffers.

SUMMARY

It is now the task of the present invention to avoid the aforementioned disadvantages of the prior art or at least to reduce them substantially. In particular, it is the task of the present invention to provide a suction cleaning attachment with which a good cleaning result can be achieved in a short time.

According to the invention, a suction cleaning attachment of a cleaning device for cleaning the interior of motor vehicles by means of a suction air flow is used to solve the above-mentioned problem. The suction cleaning attachment is provided with a housing having a suction channel for guiding the suction air flow. In addition to the suction channel, a compressed air channel for guiding a compressed air flow is provided in the housing and/or a compressed air channel for guiding a compressed air flow is assigned to the housing in addition to the suction channel. On the outside, a handle area—provided for gripping the suction cleaning attachment with one hand—is provided on the housing. According to the invention, a switch, preferably a swivel lever, is provided for controlling the compressed air flow, the switch being arranged on the handle area and/or in the region and/or in the vicinity of the handle area in such a way that the switch can be actuated by a hand encompassing the handle area with the same hand.

Actuation of the switch can trigger a release of the compressed air flow. Therefore, the compressed air connection can be connected to the switch, preferably directly.

In addition, the arrangement of the switch according to the invention enables simple operation of the suction cleaning attachment, in which the compressed air operation and/or the compressed air flow can be switched on in a simple manner with the same hand holding the suction cleaning attachment when using the suction cleaning attachment for suction. Ultimately, no other hand is required to operate the switch.

This results in a significantly simplified ergonomic use of the suction cleaning attachment, which can also increase the efficiency of the interior cleaning of motor vehicles.

An increase in efficiency results not least from the fact that switching on the compressed air flow for improved suction of hard-to-reach dirt particles can be easily performed during suction operation, thus saving time. It is understood that the increase in efficiency also results when no suction air flow is required during compressed air operation—i.e., suction operation is stopped during compressed air operation.

The switch can be coupled to a valve of a compressed air device, in particular of a compressed air accumulator, the compressed air device being associated with the compressed air channel. The compressed air can be applied to the compressed air reservoir and, after release via the switch, the compressed air can be made available to the compressed air channel of the suction cleaning attachment via the compressed air connection.

Furthermore, the switch can be connected to the valve via a control line. The switch can be used to release the compressed air flow via the valve and/or to shut off and/or interrupt the compressed air flow—ultimately, the compressed air flow can be controlled via the valve by actuating the switch. The strength of the compressed air flow, in particular the overpressure, can be adjustable by means of a pressure regulator arranged in particular outside the suction cleaning attachment.

In addition, it may also be possible, in particular according to the invention, for the compressed air flow to be controlled via the switch, in particular the flow velocity, the overpressure in the compressed air flow and/or the temperature of the compressed air flow.

The advantageous arrangement of the switch on the handle area further allows for easy operation of the switch during suction operation, since the switch can be operated by at least one finger of the hand positioned in the handle area.

According to the invention, it is essential that switching on and/or activating the compressed air operation can be carried out quickly and easily from the suction operation. This simplified activation is particularly independent of whether or not the suction air flow is also active during compressed air operation.

A further advantage results from the fact that the user is more inclined to switch on the compressed air flow more frequently, since this involves less effort. If the user were to continue to interrupt the suction operation—as previously envisaged in the state of the art—and have to release his hand from the handle area, he would only switch on the compressed air flow when "urgently required". This also results in an improved cleaning result.

An arrangement of the switch at the handle area is to be understood in such a way that the switch can be adjacent to the handle area and/or is arranged at least substantially completely at the handle area. Ultimately, the arrangement of the switch is such that activation of the compressed air operation is possible without detaching one hand from the handle area. For example, the switch can be operated by at least one finger, in particular the little finger and/or the index finger and/or the thumb.

The handle area, as previously mentioned, is formed by that area provided on the outside of the housing which is intended and used for gripping the suction cleaning attachment.

According to the invention, the handling of the suction cleaning attachment is thus facilitated, wherein the suction cleaning attachment can be grasped in the handle area by one hand of a user and thus a facilitated operation can be ensured; namely during the activation of the compressed air operation and/or during the provision of the suction air flow. In any case, a predetermined, preferably clearly recognizable, handle area is provided.

In particular, the handle area is not limited on the outside and/or circumferentially, so that it is possible for the user of the suction cleaning attachment to easily grasp the handle area from various positions. Ultimately, the handle area can be freely accessible on all sides. Incidentally, the handle area is not bridged by a bracket or the like and is circumferentially limited and thus freely accessible, so that use of the suction cleaning attachment or grasping of the handle area is possible from any user situation.

In a particularly preferred embodiment, it is provided that the switch, in particular the swivel lever, is spring-loaded by at least one spring. The spring loading, i.e. actuation of the switch against the spring force, can enable actuation of the switch, in particular the swivel lever. In the (spring) unloaded state, the switch is thus closed.

Alternatively or additionally, the switch can also be designed as a push-button switch and/or as a switch plunger. In the push-button design of the switch, it can be provided that the release of the compressed air flow is enabled by a pressure or force exerted on the switch. In particular, the switch can be formed as a pressure switch, preferably as a mechanical pressure switch that can be actuated by changing the pressure of a gaseous and/or liquid medium.

When the switch is designed as a plunger and/or switching plunger, it can be provided that the release takes place by actuating the plunger, wherein different plunger shapes can be used. The plunger can interact with other switch elements in such a way that the compressed air flow can be released when the switch is actuated. If necessary, a coupling element is provided that brings the plunger into and/or out of engagement with the switch element. Ultimately, the plunger is provided for transmitting the movement of the external actuator, the movement being transmittable to the interior of the switch or to further switch elements. Accordingly, closing or opening of contacts may be initiated. If necessary, the plunger is forced into the off position (locked position) by compression springs.

Preferably, the switch has a swivel lever which is pivotably mounted at one end and whose other end is designed for switch actuation. In particular, the other end designed for switch actuation projects into the handle area so that the switch can be easily actuated.

It is particularly preferred that the switch has the lowest possible installation height of preferably less than 6 cm, preferably between 0.5 to 5 cm, more preferably less than 2 cm, preferably less than 1.5 cm, and in particular conforms and/or fits to the shape of the housing and/or the area on which it is arranged. This facilitates handling and allows improved access to poorly accessible places in the interior of the motor vehicle.

Further preferably, the housing of the switch may have at least a two-part design, namely in particular the pivotable and/or displaceable swivel lever, which may serve to actuate the switch, and a fixed switch housing, which serves to arrange the pivotable swivel lever and/or the compressed air connection. The switch housing may include the other components of the switch that are not disposed in the swivel lever. The switch housing may be directly fixed to the housing of the suction cleaning attachment. In particular, the switch housing is arranged at least in some areas on the handle area. The switch housing can be positively, non-positively and/or materially connected to the housing of the suction cleaning attachment.

The swivel lever can be designed to swivel around a swivel axis, in particular wherein the swivel lever can be mounted with its one end on the switch housing. The other end of the swivel lever can be used for actuation and in particular have an actuation section.

Preferably, the spring-loaded swivel lever can be pivoted and/or displaced from at least one blocking position blocking the compressed air flow into at least one release position releasing the compressed air flow, preferably by an adjustment force exerted on the switch, in particular on the swivel lever, against the spring force of the spring. The exerted adjusting force can be exerted by the hand of the user that encompasses the handle area, in particular by at least one finger. The exerted adjustment force must be greater than the spring force of the spring, so that pivoting of the switch or the swivel lever can take place.

Furthermore, in another preferred embodiment, the swivel lever can be pivoted and/or displaced from the release position to the locked position by the spring force of the spring. When the switch or the swivel lever is to be returned to the locked position, in particular no more adjusting force is exerted on the switch, in particular the swivel lever. Ultimately, the locked position can be resumed together with the "rest position" of the spring after the release position—that is, after the compressed air flow has ended. When the user removes his finger from the switch, in particular from the swivel lever, the latter is automatically returned to the locked position.

Preferably, the spring is at least indirectly connected to an actuating means, in particular rod-shaped, at least substantially cylindrical and/or plunger-shaped, in such a way that the actuating means is designed for rotation and/or actuation of a release means, preferably an eccentric disc. The rotation and/or actuation of the release means can take place on the one hand when the swivel lever is pivoted and/or displaced from the locked position into the release position and/or on the other hand when the swivel lever is pivoted and/or displaced from the release position into the locked position.

The release means can be designed in such a way that it causes the release and/or blocking of the compressed air flow. The actuating means ultimately serves to couple the switch and/or the swivel lever to the release means. Preferably, the actuating means is directly connected to the release means, in particular wherein the release means can be arranged on the end face of the actuating means and/or actuating means is guided at least substantially centrally by the release means. In particular, the actuating means is guided through the release means.

In a further, particularly preferred embodiment, it is provided that the release means cooperates with a lock, preferably at least substantially spherical. In particular, the lock can be displaceably mounted in a guide channel having a channel opening. Alternatively or additionally, it can be provided that the compressed air flow present in the guide channel is blocked in the blocking position of the swivel lever and/or switch by the lock closing the, preferably at least substantially circular, channel opening.

The guide channel can be connected to the compressed air connection, in particular wherein the compressed air is present in the guide channel and the compressed air is only made available by the release of the lock—which is initiated via the release position of the swivel lever.

Finally, in a further preferred embodiment, it can be provided that in the release position of the swivel lever, the lock has been displaced by the release means in such a way that the compressed air flow can be guided through the channel opening of the guide channel into the compressed air channel.

The guide channel can preferably be designed in such a way that the lock can be displaced—at least indirectly—along the inner walls of the guide channel. The release position of the lock can be designed in such a way that the compressed air flow can "flow past" the lock. The lock can rest on at least one, preferably at least four, webs of the guide channel formed as a protrusion and adjoin the side walls of the guide channel and/or further webs of the guide channel, in particular wherein the, preferably spherical, lock can be transferred into the release position along the web, preferably adjoining the webs of the side walls, in the guide channel.

In the blocking position, the lock can be arranged in such a way that the compressed air flow cannot exit the guide channel past the lock. In particular, the lock adjoins a stop or the channel opening in the blocking position in such a way that the guide channel and the channel opening are closed and the compressed air flow is blocked.

In a further, very particularly preferred embodiment of the invention, the release means has at least one, preferably two, protrusions which are designed in such a way that the lock can be displaced to open the channel opening of the guide channel and/or to release the compressed air flow. Ultimately, the protrusion can cooperate with the lock—and in such a way that the lock can be displaced by the force transmitted by the protrusion.

Preferably, the swivel lever can be pivoted and/or displaced in two opposite directions in one release position each, starting from the locking position. Preferably, the locking position is located centrally between the two maximum deflections in the release positions. In particular, the swivel lever can be displaced to the left and to the right into the release position from the centrally arranged locking position. This is particularly advantageous for operating the swivel lever with different fingers and/or for using the suction cleaning attachment for both left-handed and right-handed users. This results in improved ergonomic adaptability for both left-handers and right-handers, so that a suction cleaning attachment designed to be more user-friendly for the application situation can be provided.

In particular, the switch can be arranged at the end of the handle area facing away from the suction opening of the suction cleaning attachment. Such an arrangement is advantageous from various points of view.

On the one hand, the compressed air connection can preferably be arranged directly on the switch. Thus, no lines or the like of the compressed air flow, which are led to the compressed air connection, "interfere" with the gripping of the suction cleaning attachment. The handle area can thus be kept free of compressed air lines and/or compressed air connections.

On the other hand, it is advantageous that the actuation can be carried out in an ergonomically simple manner, in particular by the little finger of the hand grasping the handle area.

Due to the end-side arrangement of the switch, in particular of the swivel lever, on the handle area, a "false activation" of the compressed air flow can also be at least substantially avoided. Although the swivel lever can be swiveled and/or displaced by the hand encompassing the handle area, unwanted actuation of the swivel lever can be at least substantially safely avoided. If the switch were located centrally on the handle area, for example, it would be comparatively easy for the compressed air flow to be "accidentally" switched on, ultimately reducing cleaning efficiency and/or interfering with suction operation.

In a particularly preferred embodiment, the cross-sectional area of the compressed air opening of the compressed air channel is between 0.5 $mm^2$ to 200 $mm^2$, preferably between 1 $mm^2$ to 80 $mm^2$ and further preferably between 10 $mm^2$ to 30 $mm^2$. Preferably, the compressed air opening is designed in such a way that a jet-shaped exit of the compressed air flow results. In this case, the jet cone of the emerging compressed air jet should be smaller than 30°, preferably smaller than 20° and in particular smaller than 10°. The jet-shaped outlet of the compressed air flow can serve for focusing and punctual use of the compressed air flow. Preferably, the compressed air opening of the compressed air channel has a circular cross-section. Furthermore, the compressed air channel may have a diameter between 0.5 mm to 20 mm, more preferably between 1 mm to 10 mm and in particular between 4 mm to 6 mm. The aforementioned diameter is selected to be sufficiently large so that a selective and targeted swirling up of dirt particles in areas that are difficult to access can be ensured.

Preferably, on the other hand, the cross-sectional area of the suction opening of the suction channel is between 100 $mm^2$ to 1,000 $mm^2$, preferably between 200 $mm^2$ to 800 $mm^2$, more preferably between 300 $mm^2$ to 600 $mm^2$ and in particular at least substantially between 400 $mm^2$ to 500 $mm^2$. Due to the aforementioned preferred range of the cross-sectional area of the suction opening, a large surface area in the vehicle interior, in particular on the floor and/or upholstery, can be vacuumed in a short time in a simple manner.

From the above range specifications for the compressed air opening of the compressed air channel and the suction opening of the suction channel, it is clear that the compressed air opening is preferably much smaller compared to the suction opening. According to the invention, it is provided that the ratio of the cross-sectional area of the suction opening to the cross-sectional area of the compressed air outlet opening is between 10:1 to 100:1, preferably between 12:1 to 50:1, more preferably between 15:1 to 25:1 and in particular between 18:1 to 20:1. Accordingly, a substantially larger cross-sectional area of a suction opening is preferably provided compared to the compressed air opening. In a preferred embodiment, a jet-like compressed air flow is thus opposed by a large-area suction air flow. The above-mentioned ratios between the cross-sectional areas according to the invention result in optimum cleaning efficiency, since ultimately suction and/or removal of the dirt particles takes place via the suction air flow, and the compressed air flow is used, if necessary, to whirl up the dirt particles, in particular from areas that are difficult to access. Furthermore, the compressed air flow can be used to displace and/or blow the dirt particles into easily accessible areas, preferably in the area of the vehicle floor, wherein the dirt particles in the easily accessible areas can be removed and/or sucked up in a targeted and purposeful manner by means of the suction air flow.

During tests in connection with the present invention, it has been found that for the specific application of interior cleaning of vehicles, an overpressure of the compressed air in the compressed air channel between 5 to 10 bar, preferably between 6 to 8 bar, yields good results. In this case, the pressure mode is usually switched on only intermittently, while the suction mode is continuous. A vacuum of between 0.3 to 0.8 bar, preferably between 0.4 to 0.5 bar, is usually provided during suction operation. It has been found that when the pressurized operation is switched on while the suction operation is running, excellent interior cleaning is possible, since the compressed air flow can reach the hard-to-reach place in the interior of the vehicle in a targeted manner, easily overcoming the negative pressure during the suction operation. When the suction operation is stopped, the air is immediately extracted via the suction channel and the swirled-up particles are sucked out of the air and onto the surface to be cleaned.

In addition, in a further, particularly preferred embodiment of the invention, the housing can have a handle section forming the handle area at least in some areas, a housing nozzle that can be detachably connected to the handle section, and an end piece that can be detachably connected to the housing nozzle. Accordingly, the housing may be formed in multiple parts so that the individual components of the housing are interchangeable. This is particularly relevant for the end piece, since this is usually subject to the greatest wear. In addition, the multi-part design of the housing has the advantage that access is possible, in particular to the suction channel and/or the compressed air channel, which are preferably located inside the housing. This also plays a role in maintenance or repair work where access to the interior of the vacuum cleaning attachment is required.

The aforementioned components, namely the housing nozzle, the end piece and the handle section, can in particular be plugged into one another. Ultimately, it can be provided that the housing nozzle is connected to the handle section and/or the end piece is connected to the housing nozzle and/or the handle section in a form-fitting, force-fitting and/or friction-fitting manner. Quite preferably, a frictional connection is provided, in particular in the form of a plug-in connection. In the state of use of the suction cleaning attachment, the aforementioned parts—that is, the handle section, the end piece and the housing nozzle—are firmly connected to one another. However, if, for example, the handle section and the housing nozzle are turned against each other, the connection can be loosened—e.g. to replace the housing nozzle.

In particular, the handle section can be inserted into the housing nozzle with a connection area. The housing nozzle ultimately has a receptacle corresponding to the connection area. In particular, the connection area of the handle section adjoins the inner wall of the housing nozzle. Alternatively or additionally, it is possible to provide that the housing nozzle can be inserted into the end piece with a connection region, wherein the connection region of the end piece adjoins the inner wall of the end piece on the inside and the end piece can have a receiving region corresponding to the connection region of the housing nozzle. Furthermore, it is also possible for the handle section to be insertable into the housing nozzle and/or for the end piece to be insertable into the housing nozzle. For this purpose, the connection areas are provided on the end piece and on the housing nozzle, respectively.

Advantageously, a taper of the suction channel is provided in the housing nozzle, wherein the at least substantially hollow cylindrical shape of the handle section changes to an at least substantially slot-like shape.

In addition, the housing nozzle can have transition surfaces that are tapered at least in some areas, in particular tapering towards the suction opening. Preferably, the housing nozzle and/or the end piece has two main side surfaces which, together with an upper side surface and a lower side surface, form the outer surface of the housing nozzle and/or the end piece. In this context, it may be provided that the main side surfaces have an area which is larger than the upper side surface and/or the lower side surface by up to 1000%, preferably between 300% to 800%. Consequently, an at least substantially elongated and/or slot-like shape of the suction opening and the suction channel can thus be achieved. The aforementioned shape facilitates handling during interior cleaning of motor vehicles, since the housing nozzle and/or the end piece have a slender shape towards the suction opening to allow better access to narrow and poorly accessible areas in the interior of a vehicle.

Furthermore, the suction channel and/or the compressed air channel can be provided at least in sections in or on the handle section, in or on the housing nozzle and/or in or on the end piece. In particular, the suction channel is guided along the inside of the handle section, the housing nozzle and the end piece, with the suction air flow exiting and/or being drawn in at the end at the opening of the end piece facing away from the housing nozzle. The compressed air channel may further be arranged on the suction air channel or associated with the housing, which may result in an arrangement of the compressed air channel on the housing nozzle. In particular, the housing nozzle and/or the suction channel tapers in the direction of the end piece. Accordingly, a higher flow velocity can be provided in the tapered region of the housing nozzle and/or the suction channel compared to the widened region.

Furthermore, the suction channel can have a pipe section inserted and/or insertable into the housing nozzle, in particular wherein the pipe section projects into the handle section and/or into the end piece. The pipe section may be detachably connectable to the end piece and/or the handle section. In addition, the pipe section may have an inner diameter of (40±10) mm.

The housing nozzle can have an outer diameter of (55±15) mm.

Consequently, the compressed air channel, which may be separated from the suction channel by the walls of the pipe section, may be located in the housing nozzle. The pipe section can taper towards the end piece and thus ensure advantageous flow conditions of the suction air flow.

Preferably, the compressed air channel, which is in particular designed as a compressed air line, is held and/or arranged on the pipe section and/or on the housing nozzle.

The compressed air line is preferably designed as a hose, in particular consisting of plastic.

A plurality of retaining means can be provided on the pipe section for locking the compressed air line and/or for clamping the compressed air line. The compressed air line can be detachably connected to the pipe section.

The detachable connection between the housing nozzle and the handle section can ensure access to the compressed air line inside the suction cleaning attachment. The compressed air line can end in the end piece, wherein the compressed air flow along the end piece is preferably guided in a channel separated from the suction channel.

Alternatively or additionally, it can be provided that the compressed air channel is arranged in the housing nozzle and, preferably, is separated at least in regions from the suction channel in the housing nozzle by at least one separator bar and/or wall. The separator bar can further be arranged in particular inside the housing nozzle, preferably adjacent to an inner wall of the housing nozzle, so that ultimately the compressed air channel can be spaced apart and/or separated from the suction channel by the separator bar. Preferably, the separator bar is firmly connected to the housing nozzle via at least one screw connection.

Preferably, the compressed air channel, which is formed at least in some areas in particular as a compressed air line, is held and/or arranged on the separator bar. As explained above, the compressed air line is preferably designed as a hose, in particular consisting of plastic.

The separator bar can preferably be designed in such a way that the compressed air channel can be detachably fastened to the separator bar by clamping by means of clamping and/or holding means. Accordingly, a plurality of holding means can be provided on the separator bar for latching the compressed air line and/or for clamping the compressed air line.

The compressed air channel can be adjacent to the inner wall of the housing nozzle, and the separator bar can be connected in particular to the inner wall of the housing nozzle, preferably in a detachable manner.

Alternatively or additionally, it can be provided that the compressed air flow can be transferred from the switch to the compressed air line forming the compressed air channel at least in certain areas and/or is transferred in the release position of the switch. In particular, it is provided that the compressed air line is guided on the inside in the handle section, the housing nozzle and/or the end piece adjacent to a respective inner wall, in particular is connected to the respective inner wall and/or is fixed. Preferably, at least one recess is provided at least regionally in the handle section on the inner wall and/or in the housing nozzle on the inner wall and/or in the end piece on the inner wall for receiving the compressed air line at least regionally. The recess can be designed to correspond to the shape of the compressed air line.

In addition, the compressed air channel provided in the housing can be designed without a valve. In particular, a valve of the compressed air device is assigned to the switch and can be controlled via the switch. The removal of the valve means that both the weight and the space requirement of the suction cleaning attachment can be kept as low as possible.

In a further preferred embodiment, the handle section has two outer connection ends and a handle section area provided between the connection ends, the outer diameters of the connection ends each being larger than the outer diameter of the handle section area. In this regard, it may be provided that the handle section does not have the aforementioned ratios of the inner diameters of the terminal ends to the inner diameter of the handle section area on the inside. Ultimately, the inner diameter of the handle section area can be formed to be at least substantially equal to the inner diameters of the connection ends. The handle section area serves to make the suction cleaning attachment easy to handle.

In the case of vacuum cleaner nozzles known in practice, no recessed engagement surface is provided for the user's hands. Ergonomically, the central handle area on the handle section is very advantageous, since a predetermined area— designed according to the ergonomics of the average user— is provided as an engagement surface, which is especially crucial for prolonged use. The handle section may have a length of (250±50) mm, and the outer diameter of the handle section area may be (45±10) mm.

In addition to the technical functionality of the handle section, the previously described shape of the handle section area results in a special aesthetic design that clearly stands out from previously known suction cleaning attachments and is ultimately appealing to the user due to its functional appearance. It is particularly preferred if the handle section area also has a sign function, in particular haptic means, such as a plurality of grooves running in parallel. The haptic means can signal to the user that touching the suction cleaning attachment in this area is intended.

The ergonomically shaped handle area and/or handle section area can enable fatigue-free work. This is ultimately characterized by the fact that the grip force required to hold the suction cleaning attachment can be applied for considerably longer than with the vacuum cleaner nozzle known in the prior art. It goes without saying that the muscles in the user's hand are not overstressed and that a premature loss of grip strength can therefore be avoided. Consequently, safe handling of the dust cleaning attachment according to the invention can be ensured in partially narrow vehicle interiors.

In a particularly preferred embodiment of the invention, it is provided that the swivel lever projects into the handle section area of the handle section, in particular the recessed handle section area and/or the handle section area forming the handle area. Quite preferably, the swivel lever projects with its first, free end into the handle section area. The aforementioned advantageous arrangement of the swivel lever makes it possible to operate the switch in a particularly simple ergonomic manner. The hand encompassing the handle section area can swivel the swivel lever with at least one finger for switch actuation.

Preferably, the handle area and/or the handle section area has a ribbing and/or a structured surface on the outside at least in some areas. Accordingly, on the one hand an increased grip strength can be made possible and on the other hand an optical marking of the grip surface can be produced. The grooves can be spaced (5±2) mm apart.

Consequently, the haptics are also improved by the corrugation and/or the structured surface and the user is furthermore given a further signal sign (haptic sign) as to which area of the suction cleaning attachment forms the handle area. From a formal aesthetic point of view, it is particularly advantageous that the handle section area can at least essentially correspond visually to the shape of the suction hose.

Very preferably, the handle section area and/or the handle section is rotationally symmetrical and/or mirror symmetrical to a central longitudinal axis. The symmetry results in ergonomically adapted handling of the suction cleaning attachment and, in particular, an aesthetically pleasing design of the handle section. Ultimately, both the handle section area and the handle section are sleeve-shaped bodies which can be manufactured in a simple manner.

According to a further advantageous embodiment, a lighting device, preferably by means of at least one, preferably two, LEDs, is provided on the pipe section, the end piece, the housing nozzle and/or the handle section, preferably on the outside, in particular facing the end piece. The lighting device may be connected to at least one line for conducting current. The line can preferably be arranged and/or held on the inside of the housing nozzle, on the outside of the pipe section and/or on the inside of the end piece and/or at least in some areas on the separator bar.

In particular, the switch, preferably the switch housing, is arranged at least in some areas at the connection end facing away from the suction opening, in particular with the swivel lever projecting at least at the end into the, in particular, recessed area of the handle section area and/or being arranged therein.

Preferably, a power connection, in particular a 4-pin plug, which is connected to the lighting device via the at least one line, is arranged on the housing, preferably adjacent to the compressed air connection.

In particular, the power connection may be located on the switch, preferably on the switch housing.

The lighting device can be mounted inside the suction channel and/or outside the suction channel on the housing nozzle, on the handle section and/or on the end piece. Ultimately, the lighting device ensures that the area to be cleaned is illuminated, especially when the light cone faces the suction opening.

The control line, in particular provided for controlling the valve arranged outside the suction cleaning attachment, can be connected to the power connection as an alternative or supplement to the electrical line of the lighting device.

To prevent soiling of the LED, to maintain the luminosity of the LED and/or to minimize mechanical stress, a protective device, in particular an LED cover, can be connected to the lighting device. The LED cover and/or the protective device can be replaced on a rotational basis. The protective device can also be detachably connected, in particular latched, to the housing nozzle, the end piece, the handle section and/or the suction channel.

Furthermore, a plurality of illuminants, in particular LEDs, can also be provided inside or on the housing. If the illuminants and/or the lighting device are arranged inside the housing, the housing nozzle, the end piece, the pipe section, the handle section and/or the bracket can be transparent and/or translucent at least in sections.

Preferably, the lighting device can illuminate the area to be extracted and/or cleaned in the vehicle interior in a targeted and purposeful manner. Advantageously, the lighting device radiates over the end piece and/or the housing nozzle and is attached to the housing nozzle and/or the handle section. In particular, the lighting device can illuminate poorly illuminated areas, for example between the vehicle seats, in the vehicle interior.

Preferably, a channel designed to accommodate the lighting device is provided on the end piece, on the housing nozzle and/or on the pipe section. Alternatively, the lighting device can be detachably fastened to the separator bar.

Preferably, the channel and/or the lighting device is integrated in the housing nozzle and/or arranged in the housing nozzle, in particular on the outside, facing the housing nozzle on the pipe section. This channel is set back relative to the suction opening. Thus, the end of the channel is spaced from the suction opening. In this way, there is good illumination of the area to be cleaned, even when the end piece with the suction opening is placed on the surface to be cleaned. In other respects, too, good illumination of the area to be cleaned is provided by the setback of the channel with respect to the suction opening, since the light cone and/or light beam generated by the lighting device can spread out sufficiently far and radiate accordingly.

If required, the lighting device and/or LED lighting can be controlled via a further switch. The lighting device also increases cleaning efficiency, as it makes the dirt and/or particles that can be removed by the suction cleaning attachment visible in niches, gaps and/or on the vehicle floor, for example, so that suction and/or agitation of these dirt particles can be carried out in a targeted manner.

In addition, the material of the housing, the end piece, the housing nozzle, the pipe section, the switch, the guide channel and/or the handle section can comprise a, preferably thermoplastic, plastic, preferably polyethylene (PE), polypropylene (PP), polyvinyl chloride (PVC) and/or polystyrene (PS). Preferably, the material used is polyethylene, as this is particularly gentle in handling the upholstery in the interior of the motor vehicle. Most of the plastic parts in the interior of the vehicle are made of acrylonitrile butadiene styrene (ABS) and/or have ABS as the material. Since PE is softer than ABS, damage by the suction cleaning attachment in the vehicle interior is at least substantially avoided. Polystyrene can also be provided for transparent formation at least for the housing nozzle.

Furthermore, a, preferably bracket-like, line fastening means can be attached to the handle section, in particular to the connection end facing away from the end piece, as strain relief. The line fastening means can be provided for the passage and/or fastening of the line(s) to be connected to the power connection and/or compressed air connection, in particular wherein the line(s) can be fixed to the line fastening means by means of cable ties and/or suitable fastening means. Preferably, an interference during cleaning operation by the line(s) can be avoided accordingly.

In particular, the suction cleaning attachment is designed to be inserted and held in a quiver when not in use. Ultimately, the suction cleaning attachment can be removed from the quiver for cleaning the interior of motor vehicles.

Accordingly, the non-use condition is provided before and after the interior cleaning of motor vehicles. The suction cleaning attachment is used to extract dirt particles from the interior of motor vehicles by means of a suction air flow.

In a particularly preferred embodiment, a stop in the form of a step or a stop projecting beyond the handle area is provided on the outside of the housing between the suction opening and the handle area to cooperate with the outer edge and/or the edge of the quiver.

Preferably, the stop, in particular the circumferential stop, is at least substantially flush with the outer edge of the quiver. Preferably, the stop projects over the outer edge of the quiver when the suction cleaning attachment is inserted in the quiver.

According to the invention, the outer edge of the quiver is hereinafter also understood to be the outer edge area of the quiver—both on the inside and on the outside—or the outer edge. In particular, the stop of the suction cleaning attachment can be arranged at least in some areas within the outer edge area of the quiver in the non-use state.

For example, the quiver can have an inner stop arranged in the outer edge region for, preferably flush, termination with the stop of the suction cleaning attachment. Accordingly, the stop of the suction cleaning attachment can be surrounded, at least in some areas, by the outer edge of the quiver in the non-use state. In the following, the aforementioned arrangement of the stop of the suction cleaning attachment within the outer edge region is also understood as a "flush closure" between the quiver and the stop of the suction cleaning attachment.

The holder forms a receptacle for the suction cleaning attachment, wherein it has an outer surface and an underside that is closed at the end and/or face. The opening of the holder, into which the suction cleaning attachment can be inserted, is ultimately open and/or exposed and readily accessible to the user. In particular, the quiver may have a hollow cylindrical shape. Ultimately, the quiver is at least substantially tightly formed on its lateral surface and on its closed underside, in particular wherein the quiver has no further openings besides the quiver opening.

According to the invention, the stop enables an at least substantially pressure-tight seal to be ensured between the quiver and the suction cleaning attachment when not in use. This achieves a number of advantages according to the invention.

The stop also provides a limitation of the insertion movement of the suction cleaning attachment into the quiver. In particular, insertion into the quiver beyond the stop is not provided or possible at all.

The handle area, which is preferably clearly identifiable, is arranged outside the quiver, in particular in the non-used state and in the used state in the quiver.

The stop and the resulting defined handle area also ensure that the suction cleaning attachment can be removed from the holder comparatively easily. Since the suction cleaning attachment cannot be pulled into the holder due to the stop, the user can easily grip around the defined handle area and "pull" the suction cleaning attachment out of the holder without any problems. After loosening the pressure-tight closure, the suction cleaning attachment can be removed from the quiver easily and without great effort in a user-friendly manner.

Furthermore, it has been recognized during the course of the invention that the at least substantially pressure-tight closure between the quiver and the suction cleaning attachment can significantly reduce the energy required for the fan device, preferably by up to 20%. Ultimately, the at least substantially pressure-tight closure between the outer edge of the quiver and the stop means that a negative pressure can be maintained comparatively easily—i.e. with a low energy input—in the non-use state. Accordingly, an at least substantially self-contained system exhibiting the negative pressure of the suction air flow is made possible in the non-use state in accordance with the invention.

In order to cooperate with the outer edge of the quiver, it is particularly necessary for the stop to be arranged against the outer edge of the quiver so that an at least substantially pressure-tight seal is created between the quiver and the suction cleaning attachment. In this connection, two embodiments are basically conceivable. Firstly, the stop can be designed as a step, the step being arranged between the handle area, which is arranged outside the quiver in the non-use state (i.e. inserted state of the suction cleaning attachment in the quiver), and the front region of the suction cleaning attachment inserted in the quiver. Alternatively or additionally, it is secondly provided in accordance with the invention that the stop projects beyond the handle area and can thus ultimately be designed as a projection.

In a particularly preferred embodiment, the stop is designed as a circumferential, in particular annular, projection. The stop is directly adjacent to the housing and/or forms part of the housing. Preferably, the stop is designed to correspond to the shape of the outer edge of the quiver so that a flush support results.

In addition, the stop can be arranged at the connection end facing the suction opening. In particular, the stop protrudes on the outside above the surface of the connection end. The connection end can have an at least essentially hollow cylindrical shape.

In another particularly preferred embodiment of the present invention, the stop is directly adjacent to the housing nozzle. Preferably, the stop adjacent to the housing nozzle may protrude beyond the handle area, in particular beyond the connection end. In this case, the stop can be arranged at the connection end and adjacent to the connection area for the housing nozzle. The thickness and/or height of the stop can in particular be designed to be greater than the material thickness of the housing nozzle, so that even after the housing nozzle has been arranged on the connection area of the connection end of the handle section, the stop protrudes over the housing nozzle and over the connection end. Finally, the stop can be formed in such a way that it is flush with the outer edge of the quiver in the non-use state.

Alternatively or additionally, the stop, preferably in the form of a step, can be arranged on the outside of the housing nozzle. The stop can be arranged on the outside of the housing nozzle and adjacent to the connection end. The step formed by the stop can be designed in such a way that the stop can form a limit to the insertion movement of the suction cleaning attachment into the quiver.

According to the invention, operational safety can be increased by the interaction of the stop and the outer edge of the quiver, since a predetermined and defined arrangement of the suction cleaning attachment in the quiver is made possible via the stop.

Advantageously, the end piece has a slope at the suction end forming the suction opening. The slope can be arranged in particular along the at least essentially rectangular shape of the suction opening. The slope enables an improved arrangement of the end piece with the suction opening on the surfaces to be cleaned. This can facilitate ease of use when used for cleaning the interior of motor vehicles.

When cleaning the interior of motor vehicles, areas of the interior that are difficult to reach often have to be exposed to the suction air flow to extract dirt particles. The slanted end piece ensures improved contact and accessibility of hard-to-reach areas.

In particular, the end sloping may be at an angle of 45°±15°, allowing hard-to-reach areas of the interior of motor vehicles to be reached by the user, without assuming a forced posture of a user.

In a further embodiment of the invention, it is provided that the end piece has a marking on the outside, in particular running parallel to the slope, as a wear indicator. The marking can either be embossed into the end piece and/or arranged on the top of the end piece by means of a colored highlighting. The wear indicator is ultimately intended to indicate to the user when it is necessary to replace the end piece, in particular to prevent damage to the housing nozzle. In this context, it is advantageous if the marking is arranged behind the housing nozzle, facing the suction opening, when the end piece is connected to the housing nozzle. If the marking is exceeded, there would ultimately also be wear of the housing nozzle, which should preferably be avoided.

In particular, the marking is arranged at a distance from the outer edge of the housing nozzle facing the suction opening when the end piece is inserted into the housing nozzle.

As a result, the replaceable end piece can extend the service life of the suction cleaning attachment, especially since only the end piece needs to be replaced when worn. Such a multi-part design of the suction cleaning attachment is particularly advantageous in connection with good ecological compatibility and resource-saving use of the suction cleaning attachment.

Finally, the end piece can be designed as a "wear piece" that is comparatively easy to replace. The dimensions and design of the end piece are such that it can reach the largest possible suction area in the shortest possible time in vehicle interiors, as well as areas of the interior that are difficult to access, and at least substantially remove dirt particles.

In accordance with a further aspect of the present invention, the invention relates to the use of a cleaning device for the interior cleaning of motor vehicles, having a suction cleaning attachment of the type described above, having a fan device for generating a vacuum and having a compressed air device, in particular a compressed air reservoir and/or compressed air generator, the compressed air device being assigned to the compressed air channel of the suction cleaning attachment and/or the fan device being assigned to the suction channel of the suction cleaning attachment.

To avoid unnecessary repetition, reference is made to the previous explanations concerning the suction cleaning attachment according to the invention, which also apply in the same way to the cleaning device according to the invention. Ultimately, it is understood that preferred embodiments of the suction cleaning attachment can also be applied to the cleaning device according to the invention.

The fan device can be flow-connected to the suction cleaning attachment via a suction hose. Accordingly, the suction hose can be connected to the suction cleaning attachment, in particular the handle section, preferably at the connection end of the handle section, via a suction adapter.

A blow-out device can be assigned to the fan device, which can blow out cleaned air. In the blow-out device, the dirt particles captured by the suction flow can be separated from the air.

The lighting device of the suction cleaning attachment can be coupled with the fan device and/or the switch and/or the compressed air device. Thus, the lighting device can be controlled depending on the suction operation, the compressed air operation and/or the switch position. For example, the LEDs and/or the lighting device can light up during the suction and/or compressed air operation.

In a further preferred embodiment, a compressed air connection line connecting the suction cleaning attachment to the compressed air device and/or at least one connection line, in particular connecting the lighting device to an energy supply device, is connected to the suction hose, in particular positively, via at least one fastening means. Preferably, the fastening means is connected to the corrugated suction hose via a, in particular detachable, snap-in connection. Thus, the fastening means can be connected to at least one grooved leg of the suction hose, in particular releasably, positively and/or latched. In addition, the fastening means can be multi-part and designed to accommodate the compressed air connection line and the electrical connection line. In particular, the fastening means has two side parts to be latched together and an attachment to be positively connected to the side parts as a cover, wherein the attachment can have a rounded and/or curved outer side and rounded edges. The aforementioned design of the covering attachment makes it possible to avoid any damage to the interior of the vehicle during handling and any injuries to the user.

The fastening means can have a receptacle with at least one, preferably two three, receptacle areas, the compressed air connection line and, preferably, the at least one electrical connection line being provided in the receptacle areas. Two receiving areas can be provided for the electrical connection line, so that the fastening means can be latched to and/or with the suction hose independently of the receiving area for the electrical connection line.

With the aid of the fastening means, the compressed air connection line and/or the electrical connection line can be securely fixed to the suction hose and thus, likewise when using the suction cleaning attachment, undesirable movement, for example jamming in the vehicle interior, of the compressed air connection line and/or the electrical connection line is avoided. In particular, the fastening means are designed in such a way that the bending radius and/or the freedom of movement of the suction hose is not reduced and/or restricted.

Furthermore, the cleaning device may comprise at least one quiver for holding the suction cleaning attachment when not in use—that is, before and after interior cleaning of motor vehicles.

In particular, the quiver can be hollow-cylindrical in shape. The quiver can also be closed at the ends, with the preferably provided stop of the suction cleaning attachment interacting with the outer edge of the quiver in such a way that an at least essentially pressure-tight seal is produced.

The pressure-tight seal between the outer edge of the quiver and the stop of the suction cleaning attachment ensures an at least essentially self-contained, preferably pressure-tight, system between the suction cleaning attachment and the fan device, which can reduce the electrical energy consumption of the system. Finally, at least one pressure sensor can be associated with the suction cleaning attachment, which measures the existing negative pressure and thus increases the electrical energy supplied via an energy supply device in the use state. In the non-use state, the electrical energy required for the suction air flow of the suction cleaning attachment is reduced.

In the inserted state of the suction cleaning attachment, the stop is directly adjacent to the quiver. In particular, the stop protrudes over the outer edge of the quiver. Finally, the stop also limits the insertion movement of the suction cleaning attachment into the holder. The stop can be formed circumferentially around the housing corresponding to the outer edge of the quiver, so that an at least substantially pressure-tight closure is made possible while avoiding frictional clamping between the suction cleaning attachment and the quiver.

Alternatively or additionally, the quiver can have an inner stop in the outer edge region for flush closure with the stop of the suction cleaning attachment, in particular wherein the stop of the suction cleaning attachment can be surrounded by the outer edge of the quiver and/or arranged within the outer edge region of the quiver, at least in certain regions. Here, the outer edge of the quiver can also be understood as the outer edge region and thus also an inner stop in the outer edge region of the quiver according to the invention. The "outermost, uppermost edge" of the quiver need not necessarily be regarded as the "outer edge" of the quiver.

In particular, the quiver can have a circumferential step or a circumferential inner stop in the outer edge region for flush closure with the stop of the suction cleaning attachment in the non-use state.

Further, in a particularly preferred embodiment, the fan device includes control means for reducing the electrical energy supplied to the fan device to generate the negative pressure during the condition of the suction cleaning attachment inserted into the quiver.

At least one pressure sensor may be associated with the control device to determine the required negative pressure, which in turn may be used to regulate and/or control the pressure. It is understood that by providing an at least substantially pressure-tight closure between the stop and the quiver, less electrical energy is required, since the pressure difference to be bridged can be significantly reduced compared to the state of use during the interior cleaning of motor vehicles.

Preferably, a plurality of suction cleaning attachments, preferably at least two, can be connected to a fan device. It is understood that ultimately the electrical energy supplied to the fan device can also be reduced as soon as at least one suction cleaning attachment is arranged in a quiver. According to the invention, continuous suction operation can be provided, so that a pressure-tight seal between the quiver and the stop is advantageous in terms of energy and/or operating costs.

Moreover, according to a further aspect, the present invention relates to a method for cleaning the interior of motor vehicles, with a cleaning device of the aforementioned type, wherein dirt and/or particles are extracted for interior cleaning in suction operation, and wherein dirt and/or particles can be swirled up during suction operation in compressed air operation by means of a compressed air flow.

To avoid unnecessary repetition, reference is made to the explanations concerning the suction cleaning attachment according to the invention and the cleaning device according to the invention, which can also be applied in the same way to the process according to the invention for cleaning the interior of motor vehicles. Finally, it is understood that preferred embodiments of the cleaning device and the suction cleaning attachment are also applicable according to the invention for the process according to the invention.

Among other things, the advantage of the invention is ultimately that areas that are difficult to reach can be cleaned without further ado, since the dirt particles deposited in these areas can be blown into more accessible areas and then sucked up or extracted by the suction air flow.

According to the invention, the compressed air mode can be switched on via the switch. Thus, within the scope of the process according to the invention, the compressed air operation can be switched on and off during the suction operation—depending on the area of the vehicle interior to be cleaned. Ultimately, the compressed air operation and/or the compressed air flow can be used when this becomes necessary from a cleaning point of view.

According to the invention, the compressed air flow is switched on by actuating the switch. With regard to the actuation of the switch according to the invention, reference may be made to the above explanations in order to avoid unnecessary repetitions.

Furthermore, it is understood that any intermediate intervals and individual values are included in the above-mentioned intervals and range limits and are to be regarded as substantially disclosed in the invention, even if these intermediate intervals and individual values are not specifically indicated.

BRIEF DESCRIPTION OF THE DRAWINGS

Further features, advantages and possible applications of the present invention will be apparent from the following description of examples of embodiments based on the drawing and the drawing itself. In this context, all the features described and/or illustrated constitute the subject-matter of the present invention, either individually or in any combination, irrespective of their summary in the claims or their relation back.

It shows:

FIG. 8 is a schematic perspective view of a fastening means fastening means according to the invention, FIG. 9 is another schematic perspective view of the fastening means fastener shown in FIG. 8, FIG. 10 is an exploded view of the fastening means fastener shown in FIG. 7 to FIG. 9, FIG. 14 is a schematic bottom view showing a cross-section of the switch of the suction cleaning attachment shown in FIG. 2, FIG. 15 is a schematic side view showing a cross-section of the switch of the suction cleaning attachment shown in FIG. 2, FIG. 16 is a schematic perspective view of parts of the suction cleaning attachment shown in FIG. 2, FIG. 17 is a schematic bottom view of parts of the suction cleaning attachment shown in FIG. 2, FIG. 18 is a schematic front view of the suction cleaning attachment shown in FIG. 2, FIG. 19 is a schematic cross-sectional view of the suction cleaning attachment shown in FIG. 18, FIG. 20 is a schematic perspective view of the guide channel and lock of the suction cleaning attachment shown in FIG. 2, FIG. 21 is another schematic perspective view of the guide channel and lock of the suction cleaning attachment shown in FIG. 2, FIG. 28A is a schematic perspective view of the quiver according to the invention, FIG. 28B is a schematic perspective view of a further embodiment of the quiver according to the invention, FIG. 29 is a schematic side view of a further embodiment of the suction cleaning attachment according to the invention inserted in the quiver.

DETAILED DESCRIPTION

Figure 1:
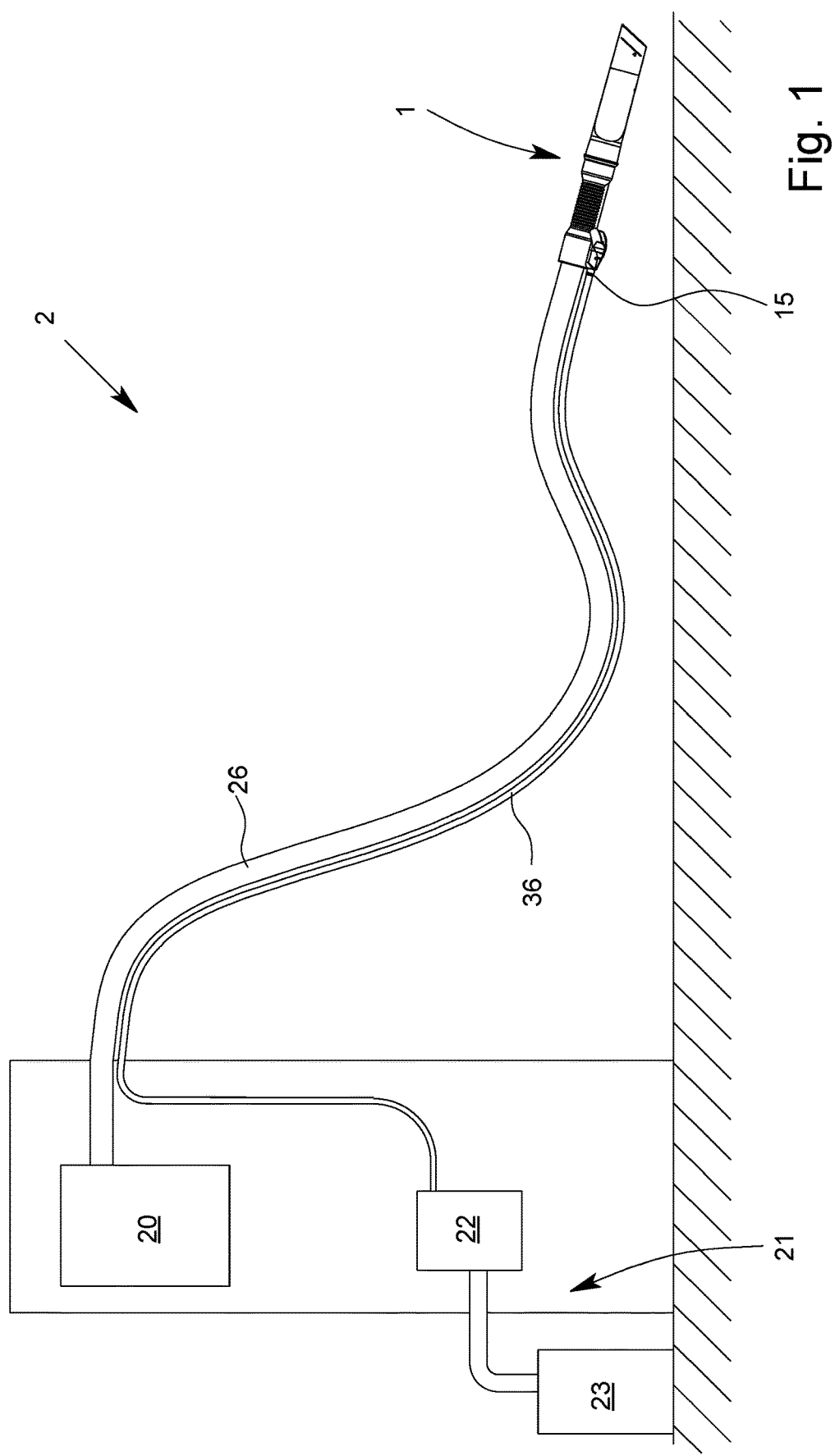
FIG. 1 is a schematic side view of a cleaning device according to the invention.

FIG. 1 shows a suction cleaning attachment 1 of a cleaning device 2 used for cleaning the interior of not shown motor vehicles. A suction air flow, which is applied to the end of the suction cleaning attachment 1, is used for interior cleaning.

Figure 3:
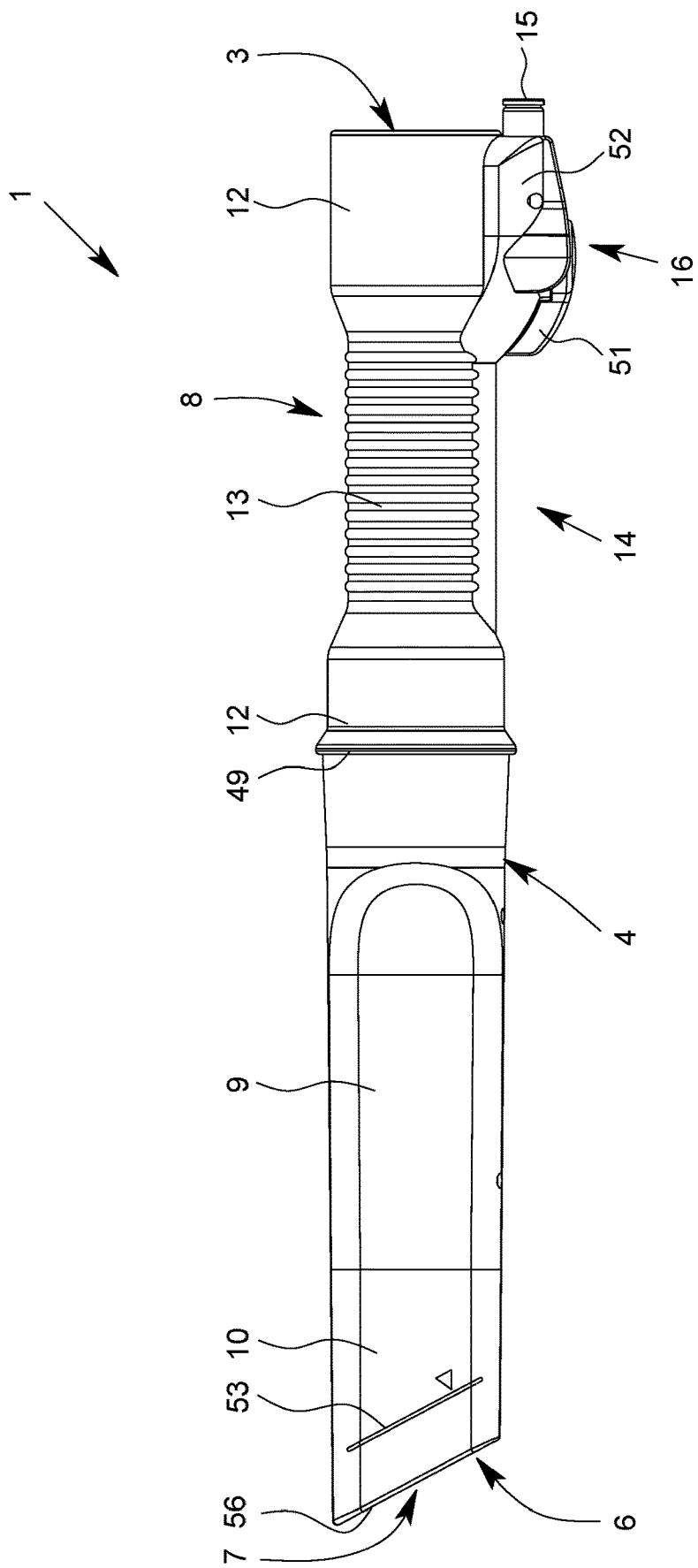
FIG. 3 is a schematic side view of the suction cleaning attachment shown in FIG. 2.

FIG. 3 shows a suction channel 3 of the suction cleaning attachment 1 for guiding the suction air flow. FIG. 3 also shows the housing 4 of the suction cleaning attachment 1, which has the suction channel 3. In addition to the suction channel 3, a compressed air channel 5 for guiding a compressed air flow is arranged in the housing 4. In a further, not shown embodiment example, a compressed air channel 5 for guiding a compressed air flow can be assigned to the housing 4 in addition to the suction channel 3, i.e. in particular be firmly connected to the housing 4, but not be arranged and/or provided inside the housing 4.

Figure 4:
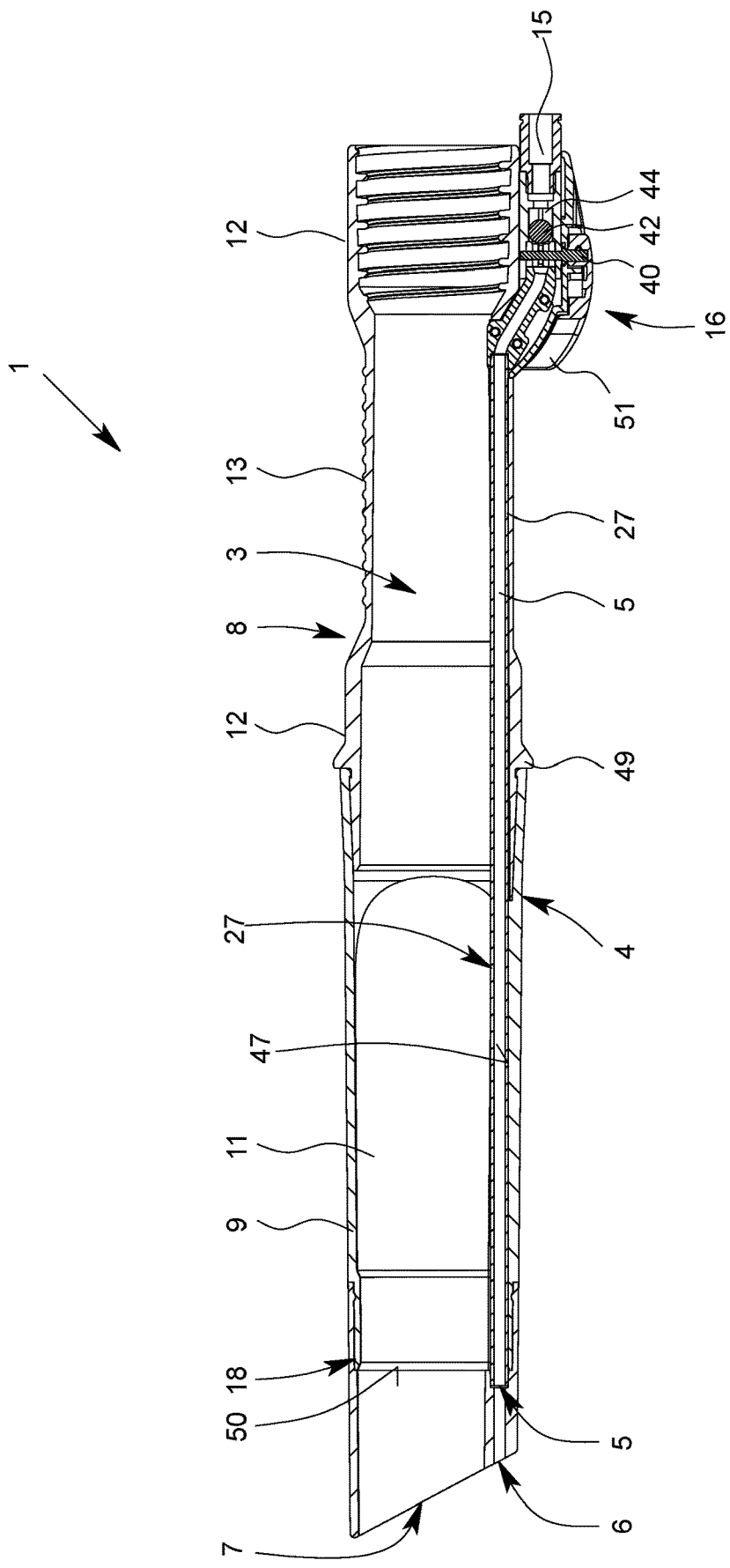
FIG. 4 is a schematic cross-sectional view of the suction cleaning attachment shown in FIGS. 2 and 3.

It can be seen from FIG. 4 that a jet-shaped exit of the compressed air flow from the compressed air channel 5 is provided via the compressed air opening 6. The compressed air cone is only slightly fanned out. The compressed air is used to blow out dirt particles from areas that are difficult to access. Furthermore, FIG. 4 shows that the suction channel 3 is formed independently of the compressed air channel 5.

Figure 2:
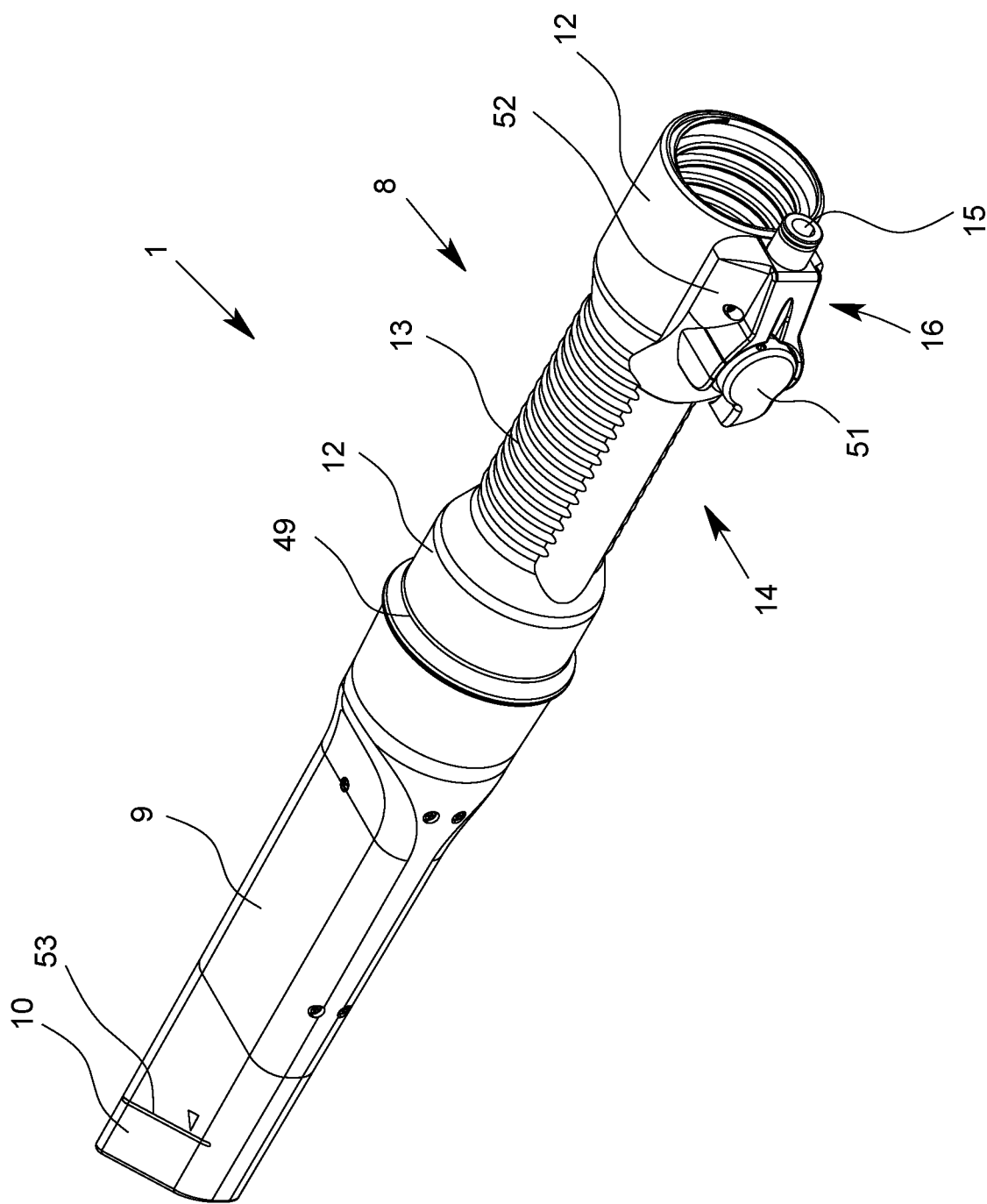
FIG. 2 is a schematic perspective view of a suction cleaning attachment according to the invention.
Figure 6:
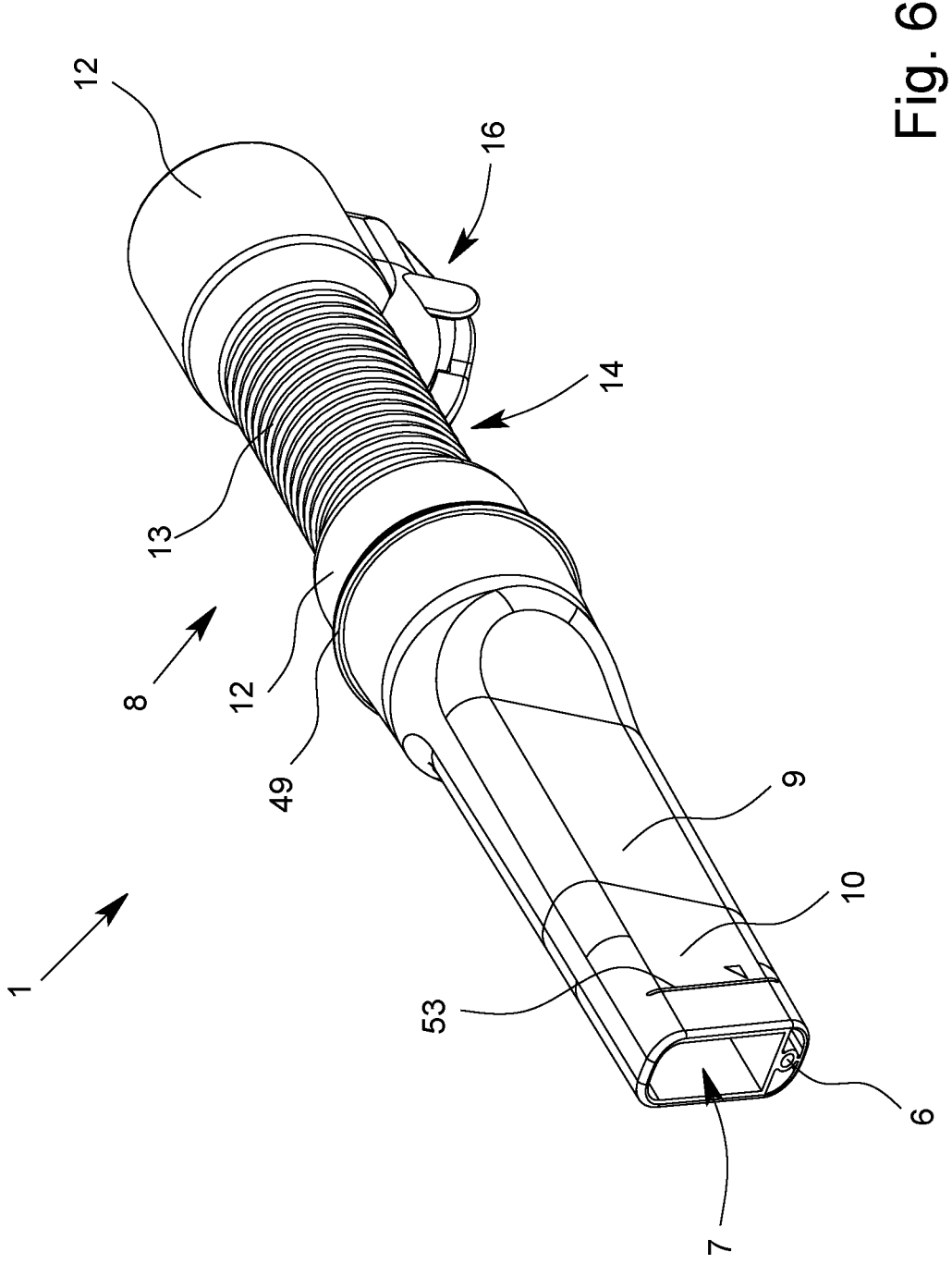
FIG. 6 is another schematic perspective view of the suction cleaning attachment shown in FIG. 2 to FIG. 4.

The suction cleaning attachment 1 shown schematically in perspective in FIGS. 2 and 6 has a handle area 14 which is provided for gripping the suction cleaning attachment 1 with one hand. The handle area 14 is designed in such a way that the suction cleaning attachment 1 can be held and/or guided by a hand of the user encompassing the handle area 14. In particular, not both hands of the user are required for holding and guiding the suction cleaning attachment 1. The hand does not have to completely encompass the handle area 14 of the suction cleaning attachment 1. It is also sufficient to grip around sections and/or areas of the suction cleaning attachment 1 to guide the suction cleaning attachment 1 safely.

Accordingly, the outer diameter of the handle area 14, in particular the handle section area 13, is between 4 cm to 15 cm, preferably between 6 cm to 10 cm, in particular at least substantially 7 cm.

FIG. 2 shows that a switch 16 is provided for controlling the compressed air flow. The switch 16 is arranged on the handle area 14 in such a way that the switch 16 can be actuated by a hand encompassing the handle area 14 with the same hand.

The switch 16 shown in FIG. 2 is also arranged and designed in such a way that it can be actuated in particular by only one finger, preferably the little finger or the thumb, of the user's hand encompassing the handle area 14. Accordingly, the compressed air flow can be easily switched on during suction operation while cleaning motor vehicles.

The switch 16 shown in the embodiment examples has a swivel lever 51 that can be pivoted to different positions for controlling or releasing the compressed air flow. The swivel lever 51 is pivotably mounted at one end, with its other, free end being designed for switch actuation, in particular having an actuating section.

Not shown is that the switch 16 may also be configured as a push button switch and/or a switch plunger. Finally, in further embodiments, the switch 16 is configured such that, on the one hand, it is adjacent to the handle area 14 or is arranged in the handle area 14 and can be actuated by the user's hand encompassing the handle area 14.

FIG. 17 shows that the swivel lever 51 is ferloaded by at least one spring 17. The spring 17 is also shown in the exploded view of the suction cleaning attachment 1 in FIG. 5.

The switch 16 can have the swivel lever 51 and a switch housing 52 as its outer housing, as shown for example in FIGS. 2 and 3. The switch housing 52 can be arranged fixedly and/or non-pivotably on the housing 4 of the suction cleaning attachment 1, in particular at least regionally adjacent to the handle area 14. In the illustrated embodiment examples, the swivel lever 51 is arranged on the upper side of the switch housing 52 and is ultimately designed as a swivelable lever. The swivel lever 51 extends into the handle area 14 and can be actuated, in particular pivoted, by a hand encompassing the handle area 14. Furthermore, the housing of the switch 16 may contain the further components of the switch 16 which cooperate to release or block the compressed air flow.

The compressed air connection 15 can be arranged on the switch housing 52, as can be seen in FIG. 2. The compressed air flow can be supplied to the suction cleaning attachment 1 via the compressed air connection 15, wherein the compressed air flow in the illustrated embodiment examples is always applied to the compressed air connection 15 when the suction cleaning attachment 1 is used and can ultimately be transferred to the compressed air channel 5 via the switch 16.

In the embodiments shown, the switch housing 52 is arranged on the housing 4 of the suction cleaning attachment 1 in such a way that it adapts and/or fits the shape of the housing 4. This makes it possible to implement a switch 16 with the lowest possible installation height of a few centimeters, in particular from 1 cm to 3 cm.

Figure 13:
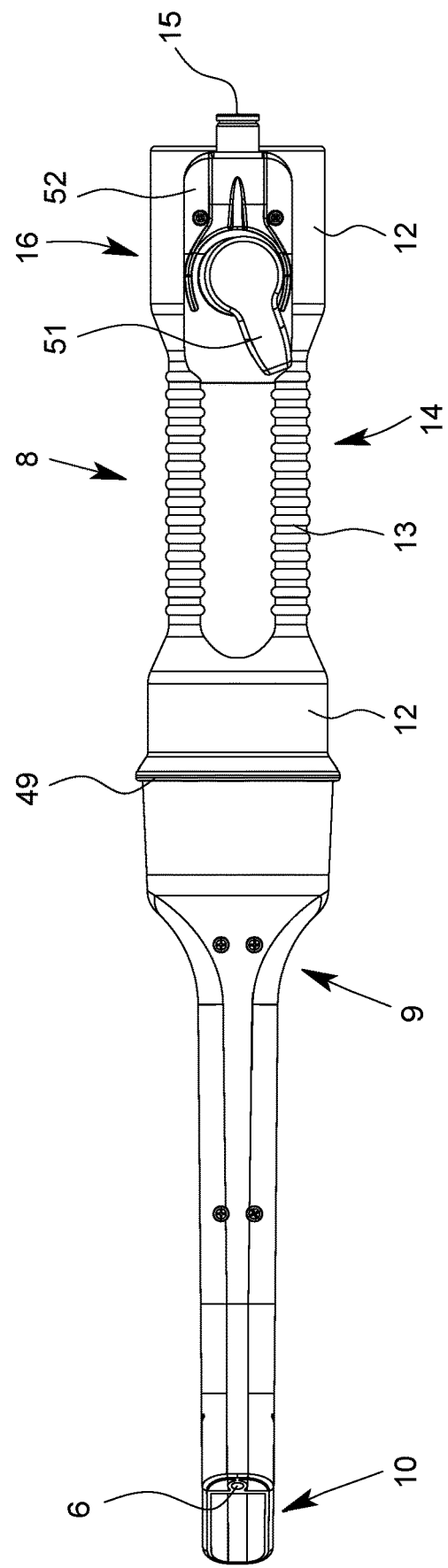
FIG. 13 is a schematic bottom view of the suction cleaning attachment shown in FIG. 2.
Figure 22:
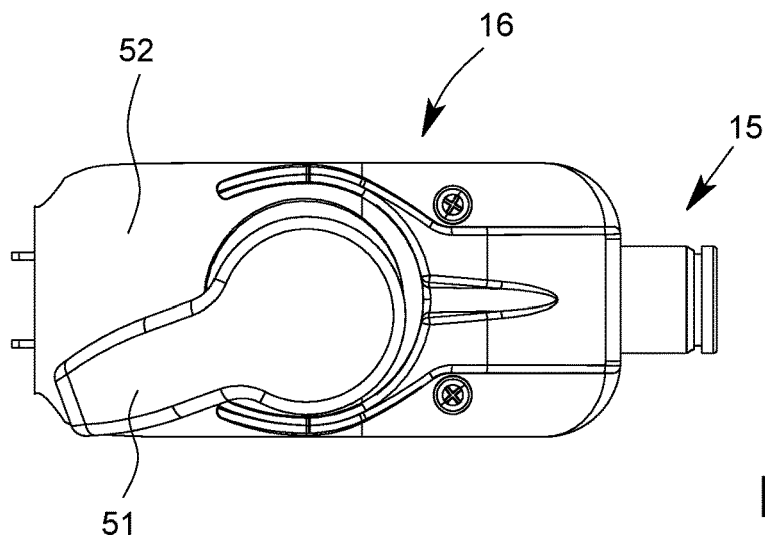
FIG. 22 is a schematic top view of a switch according to the invention in the release position.

In the illustrated embodiments, the swivel lever 51 is pivotable and/or displaceable from at least one blocking position blocking the compressed air flow shown in FIGS. 2 to 4 to at least one release position releasing the compressed air flow shown in FIGS. 13 and 22.

The transfer of the swivel lever 51 into the release position starting from the locked position can be carried out by an adjustment force exerted on the swivel lever 51 against the spring force of the spring 17 by at least one finger of the hand of a user that encompasses the handle area 14 at least in some areas.

The swivel lever 51 can be pivoted and/or displaced from the release position to the locked position by the spring force of the spring 17. In order to move from the locked position to the release position, a force must ultimately be exerted on the swivel lever 51. However, due to the spring force of the spring 17, the swivel lever 51 can be returned "independently" from the release position to the locked position without external force being applied.

In order to fix the swivel lever 51 in the release position shown in FIG. 22, it is provided that a manual force is exerted on the swivel lever 51 which exceeds the spring force of the spring 17. The swivel lever 51 is thus not held in the release position without external force being applied. This ultimately serves to ensure that the compressed air flow is not switched on unintentionally during suction operation, but—ultimately—only when necessary.

FIG. 16 shows switch 16 without swivel lever 51 in a first embodiment in which switch housing 52 is readily visible, and in a second embodiment showing switch 16 without compressed air connection 15, swivel lever 51, and switch housing 52.

Figure 23:
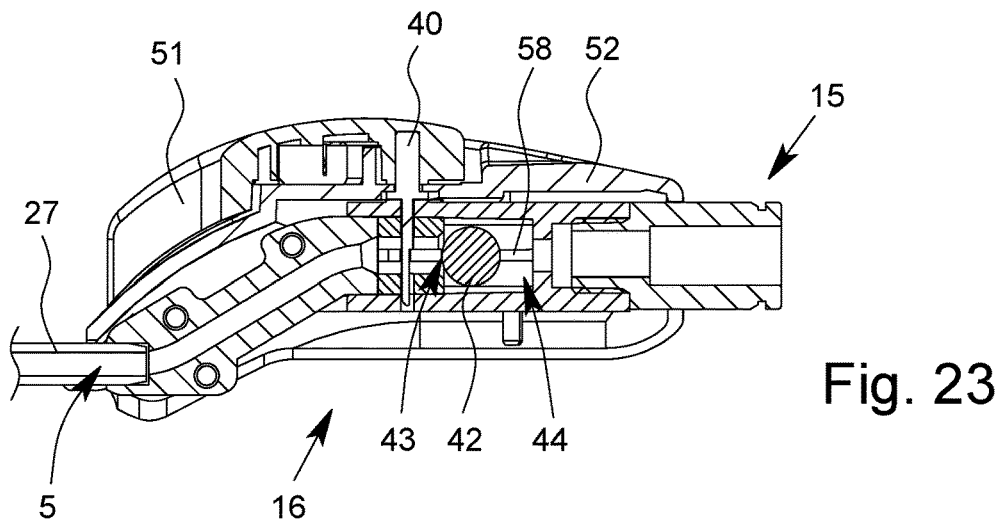
FIG. 23 is a schematic cross-sectional view of the switch shown in FIG. 22.
Figure 24:
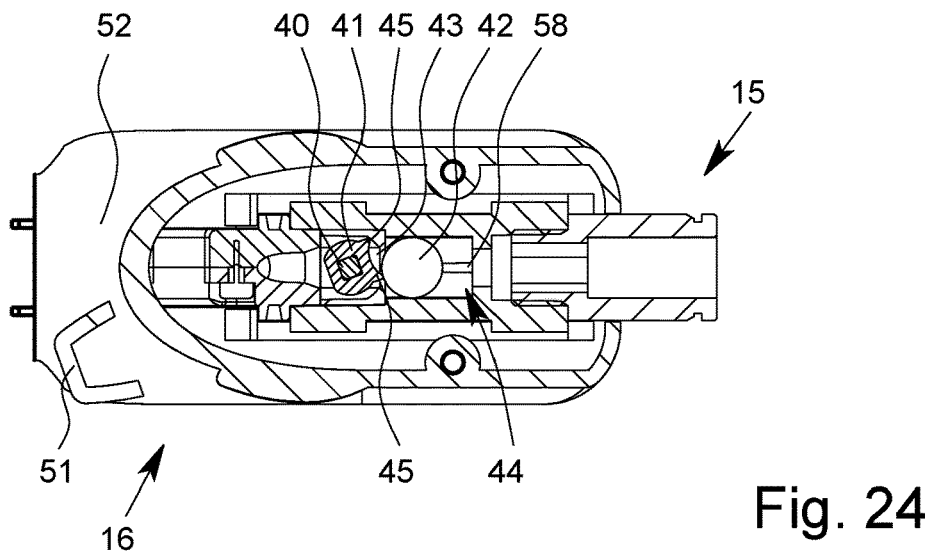
FIG. 24 is another schematic cross-sectional view of the switch shown in FIG. 22.
Figure 25:
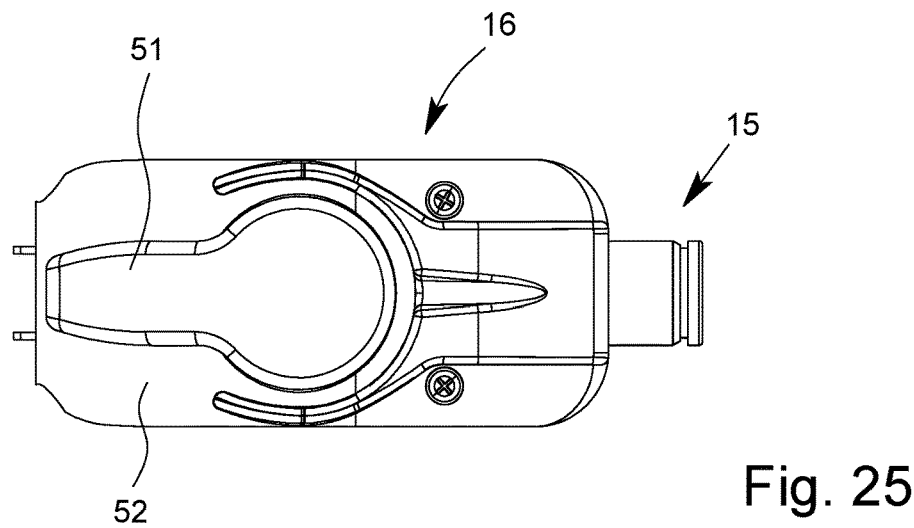
FIG. 25 is a schematic top view of a switch according to the invention in the locked position.

FIGS. 13 and 14 show the switch 16 in the release position. FIG. 14 shows a cross-sectional view of switch 16 on the underside of suction cleaning attachment 1. FIGS. 22 to 24 correspond to FIGS. 13 and 14, with FIGS. 22 to 24 showing switch 16 in detail. Here, FIG. 22 corresponds to FIG. 13 and FIG. 24 corresponds to FIG. 14.

FIGS. 13 and 14 and 22 to 24 show that the spring 17 is at least indirectly connected to an actuating means 40 in such a way that the actuating means 40 is designed to rotate a release means 41 when the swivel lever 51 is displaced and/or shifted from the locked position to the release position.

Ultimately, the spring 17 is tensioned by pivoting the swivel lever 51, this being shown in FIG. 17. In this position, the spring force of the spring 17 leads to the rotation of the at least substantially rod-shaped and/or tappet-shaped actuating means 40.

The actuating means 40 interacts with the release means 41 in such a way that the actuating means 40 can lead to the rotation of the release means 41. The release means 41 is preferably designed as an eccentric disc. In particular, the actuating means 40 can engage in the release means 41 and/or be guided through the release means 41. The actuating means 40 has, at least in regions, an at least substantially rectangular cross-sectional shape, as can be seen from FIG. 24, in the section that abuts the release means 41. The release means 41 has a receiving opening corresponding to the actuating means 40, which also has an at least substantially rectangular cross-sectional shape, so that when the actuating means 40 is rotated, the release means 41 also rotates.

Figure 26:
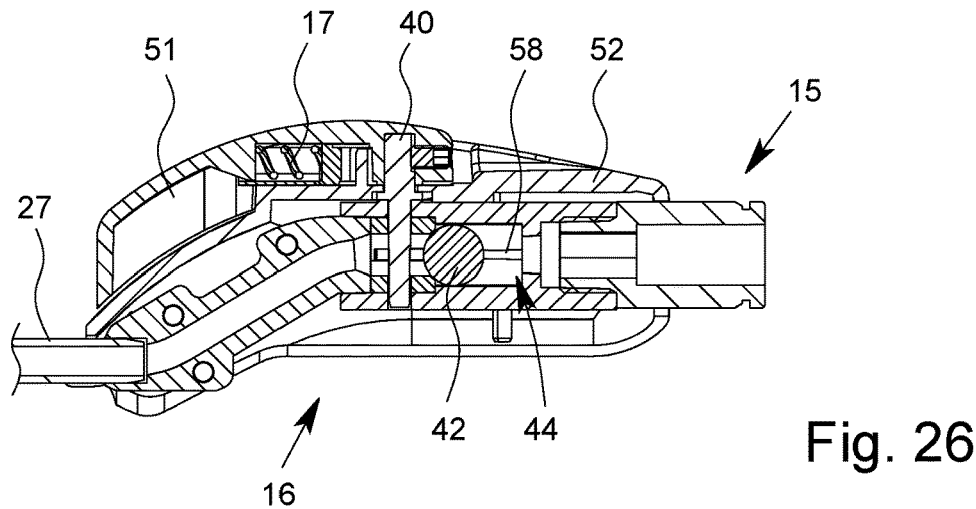
FIG. 26 is a schematic cross-sectional view of the switch shown in FIG. 25.

Of course, the actuating means 40 also causes the release means 41 to rotate when the swivel lever is pivoted and/or shifted from the release position to the locked position. The locked position and the interaction between the actuating means 40 and the release means 41 can be seen in FIGS. 26 and 27 and in FIG. 15. FIG. 26 is ultimately a detailed representation of the switch 16 shown in FIG. 15.

FIGS. 23 and 24 as well as 26 and 27 show that the release means 41 cooperates with a lock 42. In the embodiments shown, the lock 42 is at least substantially spherical in shape, as shown in FIG. 20, among others.

The lock 42 is slidably mounted in a guide channel 44 having a channel opening 43. The guide channel 44 is shown in FIGS. 20 and 21. The channel opening 43 can be seen in FIG. 21.

Figure 27:
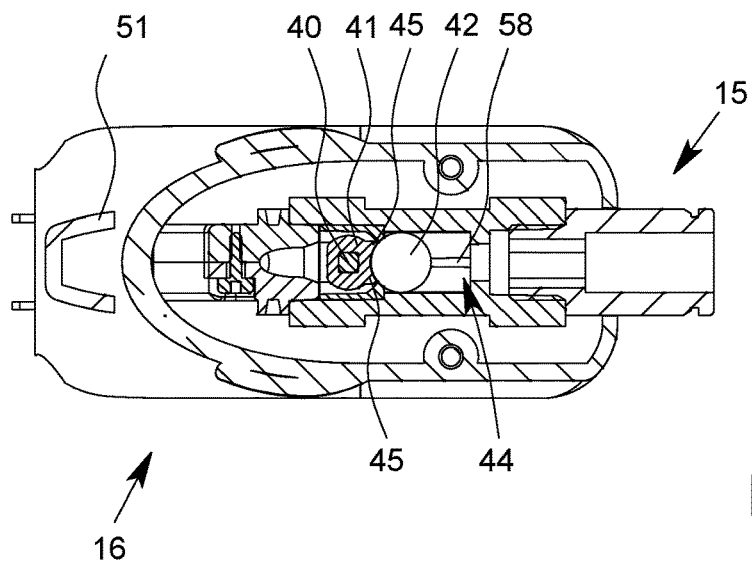
FIG. 27 is another schematic cross-sectional view of the switch shown in FIG. 25.

The compressed air is guided through the guide channel 44 and made available via the compressed air connection 15. The compressed air present in the guide channel 44 is blocked in the blocking position of the switch 16 by the lock 42 closing the channel opening 43. A lock 42 closing the channel opening 43 is shown in FIGS. 26 and 27.

FIGS. 23 and 24 show that in the release position of the switch 16 and/or the swivel lever 51, the lock 42 has been displaced by the release means 41 in such a way that the compressed air present can be guided and/or can flow through the channel opening 43 of the guide channel 44 into the compressed air channel 5.

Ultimately, the lock 42 can be displaced in the guide channel 44, wherein in the locked position of the switch 16 and/or the swivel lever 51, it closes with and/or nestles against the release means 41 in such a way that the channel opening 43 is blocked and/or closed.

In this case, the channel opening 43 may have a shape and/or cross-section corresponding to the shape of the lock 42, in particular having an at least substantially circular and/or round cross-section.

The guide channel 44 can be designed in such a way that the lock 42 can be guided along the inner wall of the guide channel 44. FIG. 20 shows that webs 58 are provided in the guide channel 44 along which the lock 42 can be guided. At least four webs 58 are provided in the illustrated embodiment. Ultimately, at least one web 58 may also be provided in further embodiments not shown.

The webs 58 are designed in such a way that in the release position of the switch 16 and/or the swivel lever 51, the compressed air can be transferred and/or flow from the guide channel 44 via the channel opening 43 into the compressed air channel 5. In the process, the compressed air can ultimately flow past the lock 42 next to the webs 58. Accordingly, the webs 58 serve, among other things, for contacting as well as for fixing and for displacing the lock 42 in the guide channel 44. Furthermore, the webs 58 form areas through which the compressed air can flow past the lock 42, these areas being created and utilized in the release position of the switch 16 and/or of the swivel lever 51.

FIG. 19 shows a cross-sectional view of the suction cleaning attachment 1 shown in FIG. 18 in the release position of the switch 16 and/or the swivel lever 51. FIG. 19 illustrates that the lock 42 rests on and/or against the webs 58 of the guide channel 44 and that the compressed air can flow past between the areas resulting between the webs 58.

In particular, the webs 58 can be formed as protrusions that project beyond the side walls or the base surfaces of the side walls of the guide channel 44. In particular, the guide channel 44 has an at least substantially rectangular cross-section, as shown in FIG. 19.

FIG. 24 shows that the release means 41 has at least one protrusion 45, in the illustrated embodiment example two protrusions 45, wherein the protrusions 45 are formed in such a way that the lock 42 is displaceable towards the opening of the channel opening 43 of the guide channel 44. In the illustrated embodiment example, the lock 42 is displaced along at least one protrusion 58. In doing so, the protrusion 45 engages the surface or the lateral surface of the lock 42.

In the locked position of the switch 16 and/or the swivel lever 51, the protrusions 45 of the release means 41 are arranged adjacent to the lock 42 in such a way that the channel opening 43 is closed, as can be seen in FIG. 27.

The switch 16 shown in the embodiments can be pivoted and/or displaced via the swivel lever 51 in two opposite directions into a respective release position starting from the locked position. In this context, the aforementioned protrusions 45 are shown to be particularly advantageous, since two protrusions 45 can ultimately ensure that, starting from an at least substantially central locking position of the switch 16 and/or of the swivel lever 51, the swivel lever 51 can be transferred into the release position, namely in two different directions. If only one protrusion 45 of the release means 41 were present, the swivel lever 51 could also be pivoted in only one direction.

The compressed air line 27 of the compressed air channel 5 can be guided into the switch 16, in particular into the switch housing 52, at least in some areas, as shown in FIG. 26, among others.

In the embodiments shown, the cross-sectional area of the compressed air opening 6 of the compressed air channel 5 is about 20 mm$^2$. In further embodiments, which are not shown here, the cross-sectional area of the compressed air opening 6 of the compressed air channel 5 can be between 0.5 mm$^2$ to 100 mm$^2$. In the illustrated embodiment, the cross-section of the compressed air channel 5 has an at least substantially circular basic shape and further has a diameter of about 5 mm.

The cross-sectional area of the suction opening 7 of the suction channel 3 shown in FIG. 4 is approximately 450 mm$^2$. In further embodiments, the cross-sectional area of the suction opening 5 of the suction channel 3 may be between 100 mm$^2$ to 1,000 mm$^2$. The suction cleaning attachment 1 shown in the illustrated embodiments has a ratio between the cross-sectional area of the suction opening 7 and the compressed air opening 6 of about 22.5:1. In further embodiments, it may be provided that the ratio of the cross-sectional area of the suction opening 7 to the cross-sectional area of the compressed air opening 6 is between 10:1 to 100:1.

During pressurized operation, an overpressure of 7 bar is provided in the compressed air channel 5 or the compressed air exits the compressed air channel 5 at the aforementioned overpressure. In further embodiments, the overpressure can be between 5 bar to 10 bar. In the suction channel 3, on the other hand, there is a negative pressure, which in the embodiments shown is about 0.5 bar. In further embodiments, the negative pressure can be between 0.3 to 0.8 bar.

Figure 5:
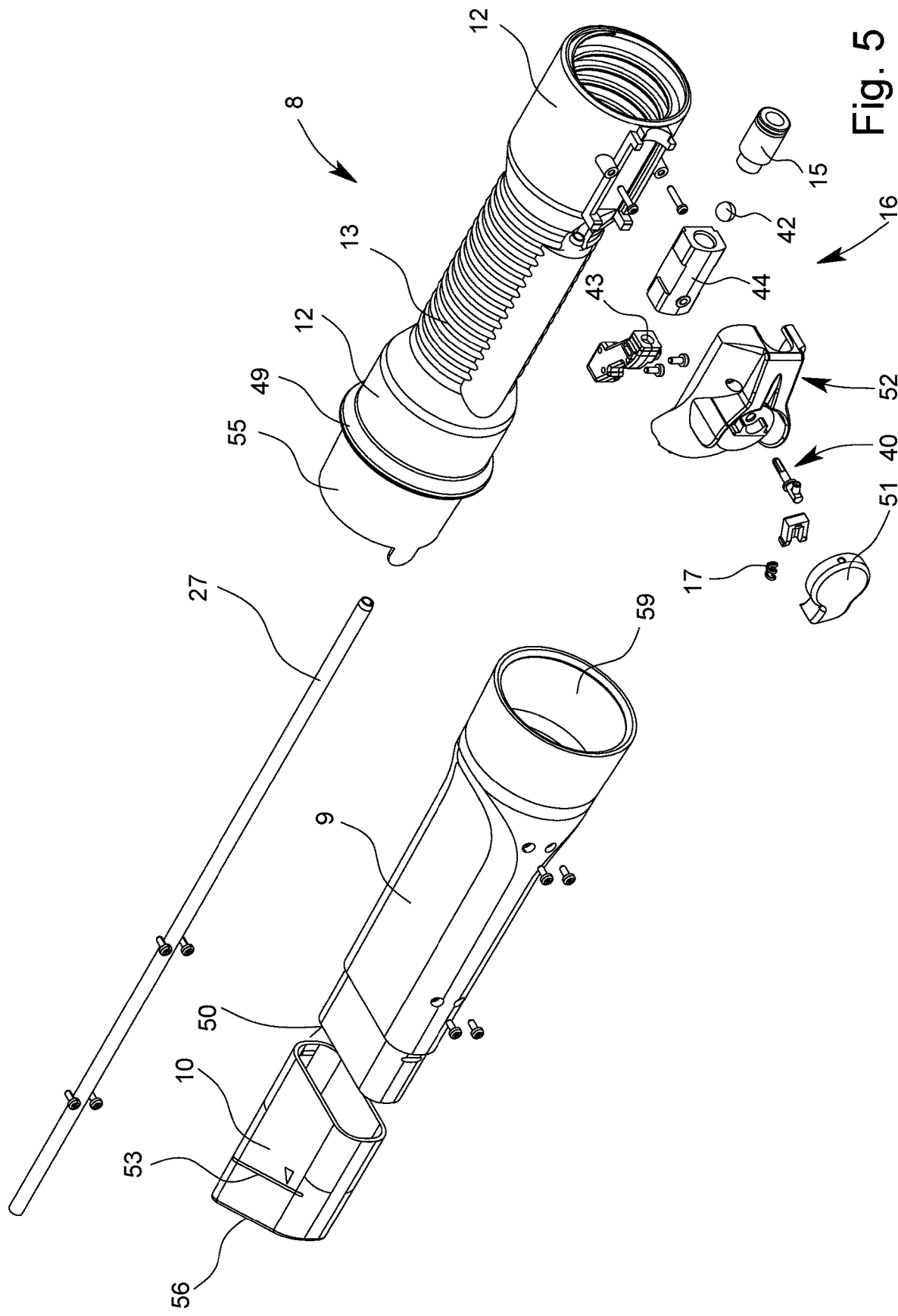
FIG. 5 is an exploded view of the suction cleaning attachment shown in FIG. 2 to FIG. 4.

FIG. 5 shows that the housing 4 is made of several parts or at least three parts, as is also evident from the other figures. The individual components of the suction cleaning attachment 1 and the housing 5 can be designed to be plugged into one another. Ultimately, a detachable connection can be provided between the multi-part components of the housing 4 of the suction cleaning attachment 1.

The housing 4 has a handle section 8 comprising the handle area 14, a housing nozzle 9 detachably connectable to the handle section 8, and an end piece 10 detachably connectable to the housing nozzle 9. The end piece 10, which is subject to greater wear than the rest of the housing 4, can be replaced independently of the other components of the housing 4. The detachable connections of the components 8, 9, 10 of the housing 4 to each other allow access to the interior of the housing 4.

Furthermore, in the illustrated embodiment example, it is shown that the end piece 10 is beveled at the end, facing away from the housing nozzle 9.

The housing nozzle 9 can be detachably connected to the handle section 8 in a form-fit, force-fit and/or friction-fit manner. The end piece 10 can in turn also be positively, non-positively and/or frictionally connected to the housing nozzle 9. Ultimately, the connection is such that loosening of the aforementioned components during use of the suction cleaning attachment 1 can be at least substantially avoided.

FIG. 4 shows that the suction channel 3 and the compressed air channel 5 are provided at least in sections in the handle section 8, in the housing nozzle 9 and in the end piece 10. In further embodiments, the suction channel 3 and/or compressed air channel 5 can be provided at least in sections on the housing nozzle 9 and/or on the end piece 10. Furthermore, FIG. 4 shows that the handle section 8 has a tapering cross-sectional area on the inside, facing the end piece 10.

FIG. 4 also shows that a positive engagement of the end piece 10 in the connection area 59 of the housing nozzle 9 can also be provided.

Furthermore, FIG. 5 shows that the handle section area 13 and/or the handle section 8 is rotationally symmetrical and/or mirror symmetrical to a central longitudinal axis.

In addition, FIG. 5 shows that the handle section 8 with the connection area 55 can be inserted into the housing nozzle 9. Alternatively or additionally, the housing nozzle 9 can be inserted into the handle section 8.

FIG. 5 further shows that the housing nozzle 9 is designed to be insertable into the end piece 10 with a connection area 59. Alternatively or additionally, the end piece 10 can also be designed to be insertable into the housing nozzle 9. Corresponding receiving areas are provided for the respective connection areas 55, 59.

Figure 32:
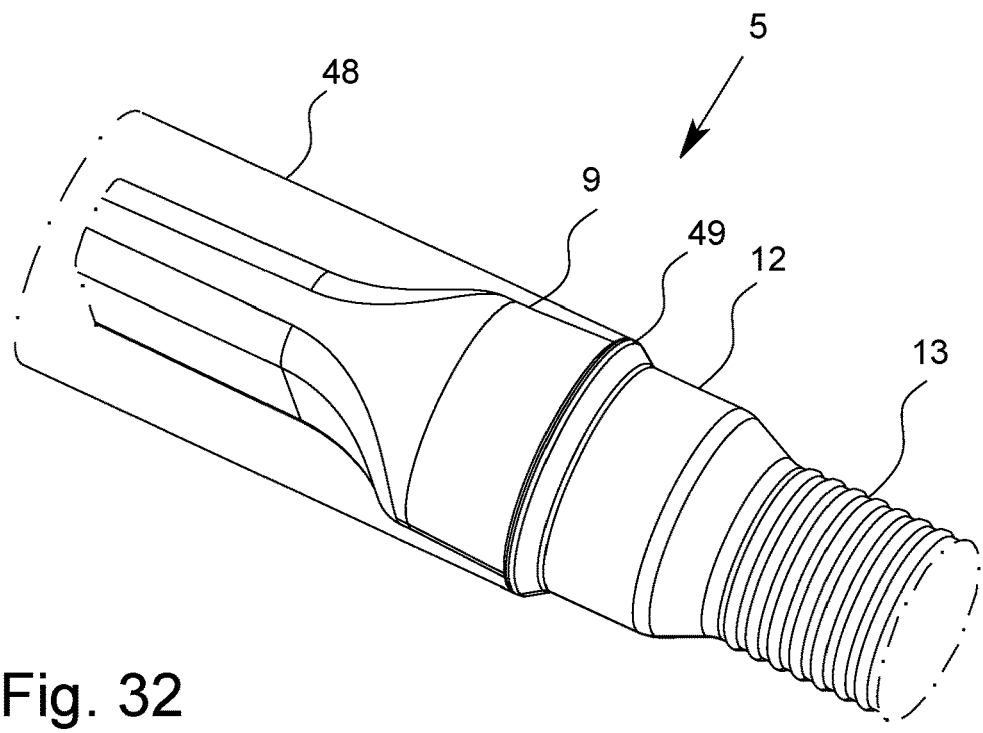
FIG. 32 is a schematic perspective view of a section of the suction cleaning attachment according to the invention.

FIG. 32 shows that a, in particular conical, taper of the suction channel 3 of the housing nozzle 9 is provided adjacent to the receiving area corresponding to the connection area 55. Ultimately, an at least substantially hollow cuboid and/or slot-like shape is formed, as also shown in FIG. 5.

Not shown is that the suction channel 3 has a pipe section 11 inserted into the housing nozzle 9. The pipe section 11 can project into the handle section 8 and into the end piece 10.

In the embodiment shown, the compressed air channel 5 is designed as a compressed air line 27 and is arranged at least in some areas in the housing nozzle 9 and in the handle section 8. The compressed air line 27 can be designed as a hose, in particular a plastic hose. Furthermore, the compressed air line 27 ends in the end piece 10, wherein the compressed air channel 5 is subsequently formed by a channel of the end piece 10 adjoining the compressed air line 27 in the direction of flow.

Not shown is that the compressed air line 27 is held on the pipe section 11. In this case, the compressed air line 27 can be clamped to the pipe section 11 and/or held by the pipe section 11 via corresponding holding means.

It is not shown that the compressed air channel 5, in particular the compressed air line 27, is separated at least in some areas from the suction channel into the housing nozzle 9 by at least one separator bar 46. The separation strip 46, which is not shown, can be fixed by a screw connection to the housing nozzle 9 and to the inner wall 47 of the housing nozzle 9. The screw connection can be seen schematically from the exploded view in FIG. 5. Ultimately, the separator bar 46 serves to distance the compressed air line 27 from the suction channel 3.

The compressed air channel 5 shown in FIG. 4 is adjacent to the inner wall 47 of the housing nozzle 9 and to the inner wall of the handle section 8.

It is not shown that the separator bar 46 is connected to the inner wall 47 of the housing nozzle 9, in particular by screw connections.

In addition, in further embodiments, it can be provided that corresponding recesses are provided on the inner wall 47 of the housing nozzle 9 and/or on the inner wall of the handle section 8 for the compressed air line 27 for receiving the compressed air line 27 at least in certain areas. Through the recesses, which are not shown in more detail, the compressed air line 27 can be guided safely through the handle section 8 and/or the housing nozzle 9.

It is understood that in further embodiments not shown, a channel receiving the compressed air line 27 may also be provided, in particular adjacent to the inner wall 47 of the housing nozzle 9 and/or the inner wall of the handle section 8, which channel receives the compressed air line 27 and ultimately leads to the end piece 10.

Moreover, FIG. 5 shows that the handle section 8 has two outer connection ends 12 and a handle section area 13 provided between the connection ends 12. The outer diameters of the connection ends 12 are each larger than the outer diameter of the handle section area 13. The handle section area 13 can form the handle area 14.

Furthermore, FIG. 2 shows that the free and/or operable end of the swivel lever 51 projects into the handle section area 13, which is recessed relative to the connection end 12. The other end of the swivel lever 51 is mounted on the switch housing 52, wherein the swivel lever 51 can be designed to swivel about a swivel axis.

The suction channel 3 can taper towards the suction opening 7 in the area of the handle section area 13 and the housing nozzle 9.

The switch 16 and the switch housing 52 are arranged on the handle section 8 in the illustrated embodiment examples. FIG. 16 shows that the switch housing 52 is arranged at the connection end 12 of the handle section 8 facing away from the suction opening 7 and extends at least in part into the handle section area 13. The swivel lever 51 adjoins the handle section area 13 and projects with its free end, which is used for actuation, into the handle area 14, as can be seen in particular from FIG. 13.

FIG. 5 shows that the connection end 12 and the handle section area 13 have an at least substantially hollow cylindrical shape.

In FIG. 3, it is shown that the handle section area 13 is ultimately freely accessible from the outside and is not obstructed by further components, in particular not by a bracket spanning the handle section area 13. Ultimately, a user can encompass the handle section area 13 of the suction cleaning attachment 1 from any side or in any position. The suction cleaning attachment 1 can be easily guided for cleaning the interior of motor vehicles.

Furthermore, FIG. 3 shows that at least one outer diameter of a connection end 12, in the illustrated embodiment both outer diameters of the connection ends 12, is larger than the outer diameter of the handle section area 13. In particular, the outer diameter of at least one connection end 12 is formed to be at least 10% larger than the outer diameter of the handle section area 13. The aforementioned difference between the outer diameters results in a defined length of the handle section area 13 and, moreover, a limitation of the movement of the hand on the handle section area 13 in the state of use is predetermined.

FIG. 2 shows that the handle section area 13 has a corrugation and/or a textured surface on the outside. The corrugation is groove-like—in the form of rows of grooves—with the grooves being arranged at intervals from one another on the outside of the handle section area 13.

It is not shown that a lighting device 18 can be provided on the suction cleaning attachment 1. The lighting device 18 has at least one LED. Furthermore, in an embodiment not shown, the lighting device 18 is held on the pipe section 11 and on the housing nozzle 9. In further embodiments not shown, the lighting device 18 can be arranged on the end piece 10, on the housing nozzle 9, on the handle section 8, on the bracket 14 and/or on the pipe section 11, and in particular can be firmly connected to the aforementioned components.

Further not shown is that the lighting device 18 is connected via at least one line 19 for carrying current. The line 19 is connected to a power connection 24, which may be provided on the switch 16. The line 19 may be held on the pipe section 11 and supplied to the lighting device 18 on the opposite side of the pipe section 11 from the compressed air line 27.

In further embodiments not shown, the line 19 may be arranged and/or retained on the inside of the pipe section 11, on the outside of the suction channel 3 and/or on the inside of the end piece 10.

In an example embodiment not shown, the power connection 24 may be provided adjacent to the compressed air connection 15.

Further not shown is that the lighting device 18 is arranged on the housing nozzle 9 and on the pipe section 11 in the channel 33 and in the housing nozzle 9. The end piece 10 can partially cover the housing nozzle 9 on the outside, so that the lighting device 18 can also be surrounded by the end piece 10 on the outside.

In an embodiment not shown, the lighting device 18 is arranged on the outer side of the pipe section 11 facing the housing nozzle 9. The light beam and/or cone of the lighting device 18, which has the at least one LED, in the illustrated embodiment example two LEDs, emerges from the light exit opening 34. An LED cover protects the LED and/or the lighting device 18 from contamination. The resulting light beam is larger and/or wider than the generated light beam due to the distance of the light outlet opening 34 from the suction opening 7 or the compressed air opening 6 when using the suction cleaning attachment 1 for cleaning an interior of motor vehicles.

The suction cleaning attachment 1 shown in FIG. 1 has a housing 4 made of a plastic material. The plastic material comprises polyethylene (PE). In further embodiments, the material of the housing 4, the end piece 10, the housing nozzle 9, the switch 16, the swivel lever 51, the switch housing 52, the handle section 8 and/or the guide channel 44 may comprise a plastic material, preferably a thermoplastic material, preferably polyethylene (PE), polypropylene (PP), polyvinyl chloride (PVC) and/or polystyrene (PS).

Not shown is that a bracket-like line fastening means 28 adjacent to the compressed air connection 15 is fastened at the end side of the connection end 12 facing away from the end piece 10, which is designed to fix the line of the compressed air device 21 and the energy supply device 25, for example by means of cable ties.

The suction cleaning attachment 1 shown in FIG. 3 is designed to be inserted and held in a quiver 48 when not in use.

Figure 30:
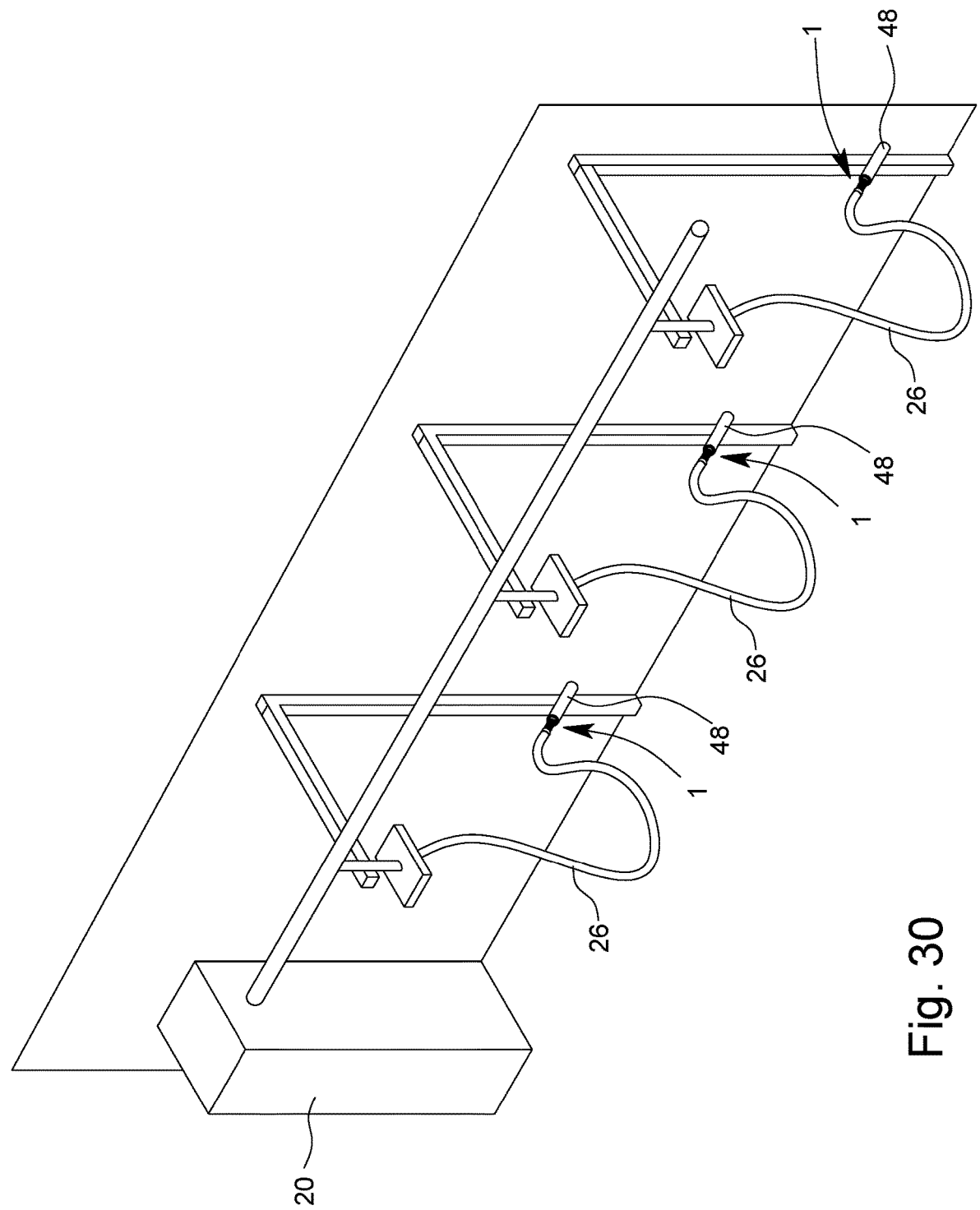
FIG. 30 is a schematic perspective view of a further embodiment of the cleaning de-vice according to the invention.

A holder of the suction cleaning attachment 1 in the quiver 48 is shown, for example, in FIGS. 29 and 30. The non-use state is ultimately present before and after the interior cleaning of the motor vehicles, and/or when the suction cleaning attachment 1 is not used for interior cleaning. In this state, the suction cleaning attachment 1 can be inserted into and held in the quiver 48, as shown in FIG. 30.

Furthermore, the handle area 14 can additionally be understood as that area of the suction cleaning attachment 1 which, when the suction cleaning attachment 1 is inserted into the quiver 48, is arranged outside the quiver 48 or above the outer edge 57 of the quiver 48.

FIG. 6 also shows that on the outside of the housing 4, between the suction opening 7 and the handle area 14, a stop 49 projecting beyond the handle area 14 is provided for cooperation with the outer edge 57 of the quiver 48. Cooperation between the stop 49 and the outer edge 57 and/or the outer edge of the quiver 48 is shown, among other things, in FIG. 29.

It is not shown that the stop 49 is designed as a step.

FIG. 29 shows that the stop 49 is flush with and/or rests on the outer edge 57 of the quiver 48, in particular with the stop 49 projecting beyond the outer edge 57 of the quiver 48. The interaction between the stop 49 and the outer edge 57 of the quiver 48 ensures the formation of an at least substantially pressure-tight seal between the quiver 48 and the suction cleaning attachment 1 in the inserted state of the suction cleaning attachment 1 in the quiver 48. It is to be understood that the term "pressure-tight" does not mean absolute pressure-tightness. "Pressure-tight" ultimately refers to the condition when the stop 49 rests flush on the outer edge 57 of the quiver 48.

FIG. 5 shows that the stop 49 is formed as a circumferential, in particular annular, projection. Ultimately, the stop 49 is at least substantially straight, uninterrupted and/or flat on its arrangement surface facing the outer edge 57 of the quiver 48. The stop 49 can be formed to correspond to the outer edge 57 of the quiver 48, so that a pressure-tight and friction-locking connection results when the suction cleaning attachment 1 is inserted in the quiver 48.

FIG. 29 shows that the stop 49 ultimately represents a limitation of the insertion movement of the suction cleaning attachment 1 into the quiver 48. In particular, no movement beyond the stop 49 into the quiver 48 is possible. This is particularly important because, in the prior art, the suction cleaning attachment 1 is frequently inserted very firmly into the quiver 48 by the user, resulting in a very tight frictional connection which not infrequently makes it very difficult to pull the suction cleaning attachment 1 out of the quiver 48 again. This problem is completely avoided in the invention.

FIG. 5 shows that the stop 49 is arranged at the connection end 12 facing the suction opening 7. The stop 49 protrudes over the connection end 12 on the outside.

FIG. 32 shows that the stop 49 is directly adjacent to the housing nozzle 9. The stop 49 protrudes both over the connection end 12 and over the housing nozzle 9. The stop 49 has a width that exceeds the material thickness of the housing nozzle 9. The width and/or height of the stop 49 is designed in particular as a function of the insertion path of the suction cleaning attachment 1 into the quiver 48 and as a function of the outer edge 57 of the quiver 48.

It is not shown that the stop 49, which is designed in particular as a step, is arranged on the outside of the housing nozzle 9. In this case, the stop 49 would not necessarily have to protrude over the handle area 14, the handle section 8 and/or over the connection end 12. However, the stop 49 should be designed to limit the insertion movement into the quiver 48. This ultimately presupposes that behind the stop 49—facing the suction opening 7—no elevation or enlargement of the suction cleaning attachment 1 and/or of the housing 4 exceeding the stop 49 is provided.

Figure 33:
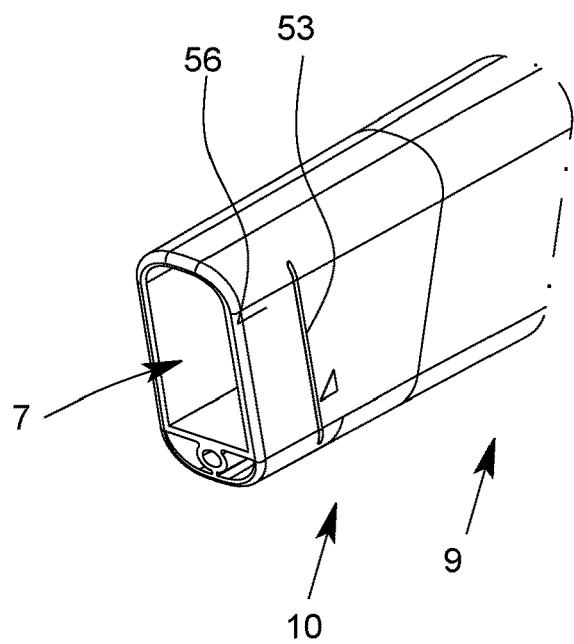
FIG. 33 is a schematic perspective view of a further section of the suction cleaning attachment according to the invention.

FIG. 33 shows that the end piece 10 has a sloping 56 at the suction end forming the suction opening 7. The sloping 56 can in particular be designed as a 45°±15° sloping.

FIG. 33 also shows that the end piece 10 has a marking 53 on the outside, in particular running parallel to the sloping 56, as a wear indicator. The marking 53 is arranged in such a way that it is arranged on the end piece 10 connected to the housing nozzle 9 at a distance from the outer edge 50 of the housing nozzle 9 facing the suction opening 7. The outer edge 50 of the housing nozzle 9 is shown in FIG. 4.

FIG. 1 shows a cleaning device 2 for cleaning the interior of motor vehicles. The cleaning device 2 has a suction cleaning attachment 1 of the type described above. Furthermore, the cleaning device 2 has a fan device 20 for generating a negative pressure and a compressed air device 21. In the illustrated embodiment, the compressed air device 21 comprises a compressed air reservoir 22 and a compressed air generator 23. The compressed air is stored and/or stocked in the compressed air reservoir 22, and the compressed air generator 23 generates the required overpressure of the compressed air flow. Furthermore, FIG. 1 shows that the compressed air device 21 is assigned to the compressed air channel 5 of the suction cleaning attachment 1 and the fan device 20 is assigned to the suction channel 3 of the suction cleaning attachment 1. In the illustrated embodiment example, an assignment is made in such a way that the fan device 20 is flow-connected to the suction cleaning attachment 1 via a suction hose 26. The compressed air channel 5 is connected to the compressed air device 21 via the compressed air connection 15 by means of a further compressed air line.

The further compressed air line can be designed as a compressed air connection line 36.

The switch 16 of the suction cleaning attachment can release the compressed air flow provided by the compressed air connection line 36 and accordingly transfers the compressed air flow into the compressed air channel 5. Ultimately, the switch 16 can block the compressed air flow provided by the compressed air connection line 36 and not transfer the compressed air flow into the compressed air channel 5.

Not shown is that the lighting device 18 is connected to an energy supply device, which provides the required current for the lighting device 18, via a power connection via a further power line. In further embodiments, the energy supply device may comprise an energy storage device, for example an accumulator. The energy supply device may also be configured as a connection to the public power grid. Furthermore, in an embodiment not shown, the energy supply device may be controlled via a control cabinet.

Not shown is that the light device 18 of the suction cleaning attachment 1 can be coupled to the fan device 20, the switch 16 and/or the compressed air device 21, in particular the valve of the compressed air device 21. Thus, switching on of the lighting device 18 may be provided in suction mode and/or in compressed air mode. Furthermore, a plurality of illuminants of the lighting device 18 may be provided, which may be controlled independently of each other, for example.

The suction cleaning attachment 1 is torsionally rigidly connected to suction hose 26 in the embodiment shown in FIG. 8. It is not shown that a twist lock 37 in the form of a clamping screw is provided at the connection end 12, which cooperates with the suction hose 26.

Figure 7:
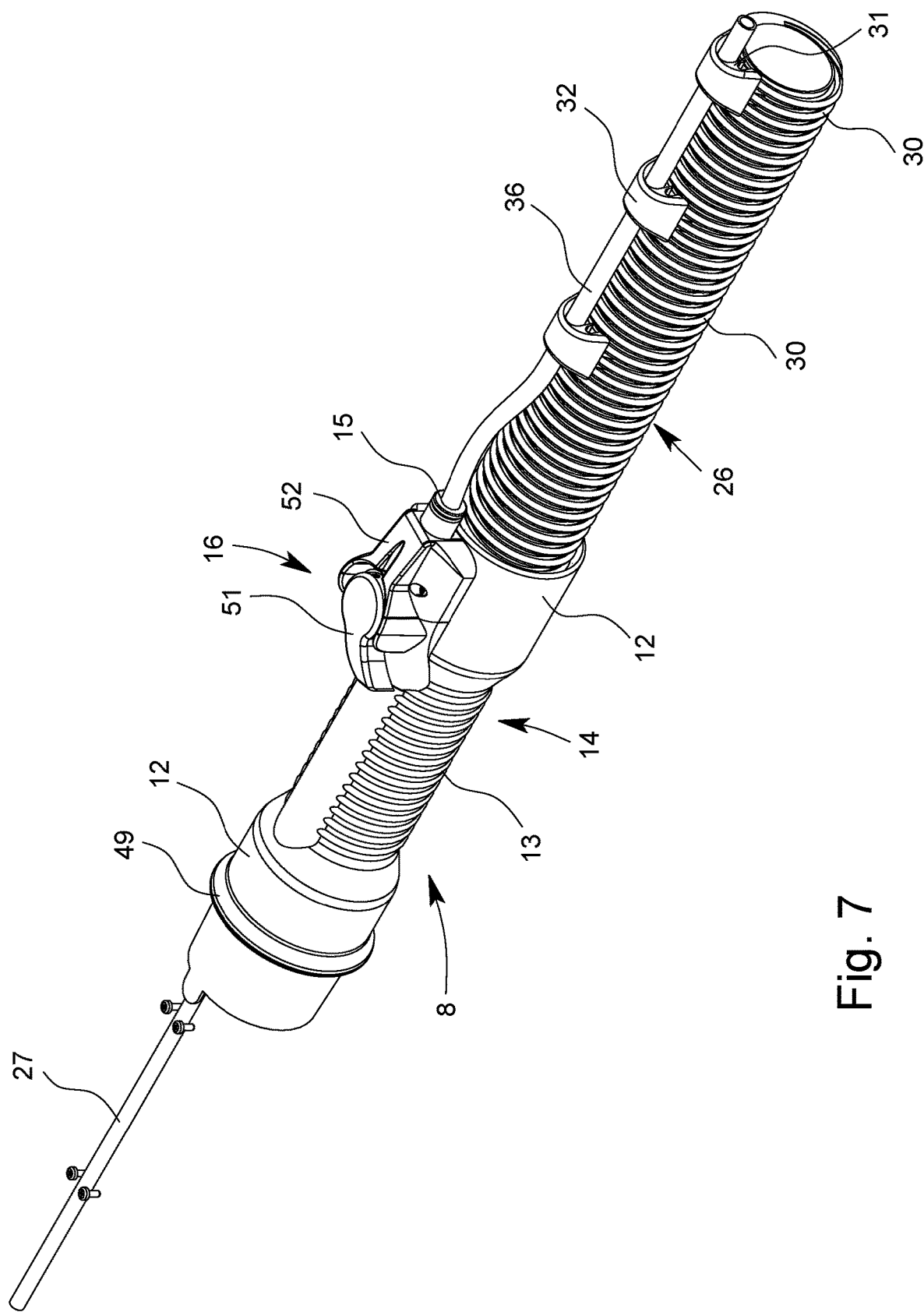
FIG. 7 is a schematic perspective view of parts of a cleaning device according to the invention.

FIG. 7 shows that a compressed air connection line 36 connecting the suction cleaning attachment 1 to the compressed air device 21 is connected to the suction hose 26 via at least one fastening means 29. The compressed air connection line 36 is connected to the compressed air connection 15.

Not shown is that at least one electrical connection line 35 connecting the lighting device 18 to a power supply device is connected to the suction hose 26 via at least one fastening means 29. The connection line 35 may be connected to the power connection.

Figure 12:
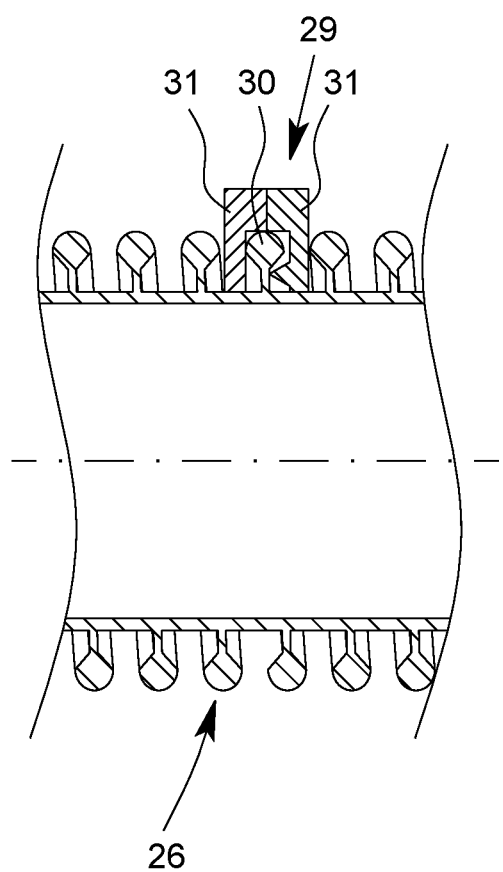
FIG. 12 is a schematic cross-sectional view of the fastening means fastener and suction hose shown in FIG. 7.

The fastening means 29 is connected to the grooved suction hose 26 via a detachable snap-in connection. FIG. 12 shows that the fastening means 29 is latched to a grooved leg 30 of the suction hose 26. The fastening means 29 shown in FIGS. 8 to 10 is multi-part and designed to accommodate the compressed air connection line 36 and, if necessary, an electrical connection line 35 not shown.

Figure 11:
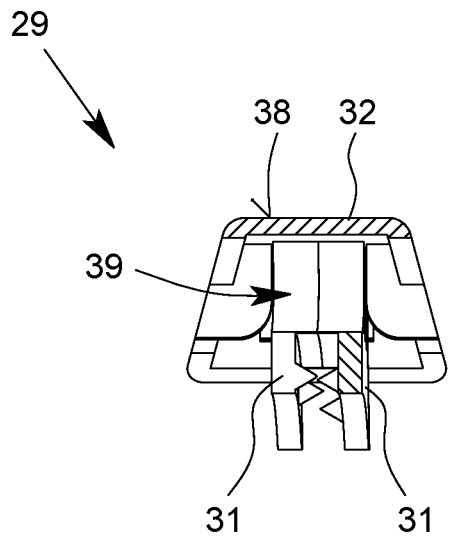
FIG. 11 is a schematic cross-sectional view of the fastening means fastener shown in FIG. 7 to FIG. 9.

FIGS. 10 and 11 show that the fastening means 29 has two side pieces 31 to be latched together and an attachment 32 to be positively connected to the side pieces 31, the attachment 32 having a rounded and/or curved outer side 38 for covering sharp edges of the side pieces 31. The rounded configuration of the attachment 32 results in a cross-sectional shape of the attachment 32 and the fastening means 29 that is at least substantially arcuate.

The fastening means 29 has a receptacle with at least two, in the embodiment example shown in FIG. 10 three, reception areas 39. FIG. 7 shows that the compressed air connection line 36 is provided in the reception area 39 and is securely fixed therein.

Two reception areas 39 are provided for the at least one electrical connection line 35, which is not shown, so that the fastening means 29 can be latched to the suction hose 26 independently of the receiving area for the electrical connection line 35, as is also apparent from FIG. 7.

FIG. 7 shows that the bending radius and/or freedom of movement of the suction hose 26 is not reduced and/or restricted by the fastening means 29. A plurality of fastening means 29 are provided for fixing the compressed air connection line 36 to the suction hose 26.

Furthermore, FIG. 7 shows that the compressed air connection line 36 is arranged on the suction hose 26 via the fastening means 29 in such a way that it lies and/or is provided in the alignment of the compressed air connection 15 and the power connection 24.

A quiver 48 is provided according to FIG. 30 in a cleaning device 2 for holding the suction cleaning attachment 1 when not in use. In FIG. 30, the compressed air device 21 and the compressed air connection line 36 are not shown for reasons of clarity.

In FIG. 28A, the quiver 48 is shown. The quiver 48 may be hollow cylindrical in shape. In addition, the quiver 48 is closed at the end on its underside and has a quiver opening opposite the underside.

In the case of the quiver 48 shown in FIG. 28A, it is provided that the outer edge 57 of the quiver 48 is at least substantially flush with the stop 49 of the suction cleaning attachment 1 in the non-use state, as shown in FIG. 29.

FIG. 28B shows that the outer edge 57 of the quiver 48 can be understood as the outer edge region. In the illustrated embodiment example, the outer edge 57 has an inner stop that can be at least substantially flush with the stop 49 of the suction cleaning attachment 1 in the non-use state. In this regard, the stop 49 of the suction cleaning attachment 1 in the non-use state and in the state inserted in the quiver 48 may be surrounded by the outer edge 57 of the quiver 48, at least in some areas, as can be seen in FIG. 34.

Figure 34:
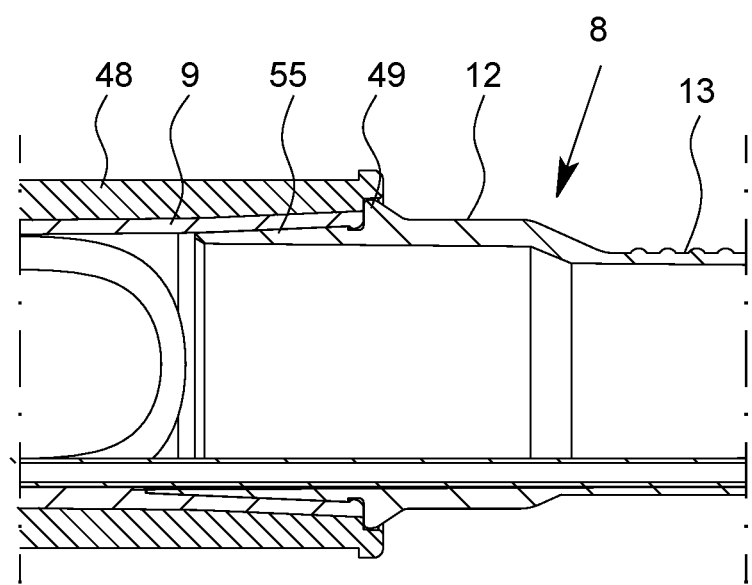
FIG. 34 is a schematic cross-sectional view of the suction cleaning attachment according to the invention inserted in a quiver.

FIG. 34 shows that the outer diameter of the outer edge area 57 of the quiver 48 is formed larger than the outer diameter of the stop 49 of the suction cleaning attachment 1.

In further embodiments, the outer diameter of the outer edge area 57 of the quiver 48 can be at least substantially equal to the outer diameter of the stop 49 of the suction cleaning attachment 1. In this case, the mutually facing surfaces of the stop 49 and of the step formed in the quiver 48 rest on one another, so that the stop function described above ultimately results. FIG. 34 further shows that the inner diameter of the inner stop of the outer area 57 of the quiver 48 is greater than or equal to the largest outer diameter of the front region of the suction cleaning attachment 1 arranged behind (i.e. facing the closed underside of the quiver 48) the inner stop of the quiver 48 in the state inserted in the quiver 48.

The stop 49 of the suction cleaning attachment 1 interacts with the outer edge 57 of the quiver 48 in such a way that an at least substantially pressure-tight closure results. The pressure-tight closure results in the non-use state. In particular, the negative pressure is continuously provided by the fan device 20. Due to the pressure-tight closure, an at least substantially self-contained system can be provided, provided that the cleaning device 2 comprises only a suction cleaning attachment 1.

In FIG. 30, it is shown that the cleaning device 2 has a plurality of suction cleaning attachments 1. In this regard, only one suction cleaning attachment 1 may be inserted into the quiver 48 while another suction cleaning attachment 1 is in use. In this case, there would not be a self-contained system, however, the electrical energy required for the fan device 20 is reduced by the placement of at least one suction cleaning attachment 1 in the quiver 48 and the pressure-tight seal between the quiver 48 and the suction cleaning attachment 1.

FIG. 29 shows that the stop 49 is flush with the outer edge 57 of the quiver 48 and rests on this outer edge 57.

Figure 31:
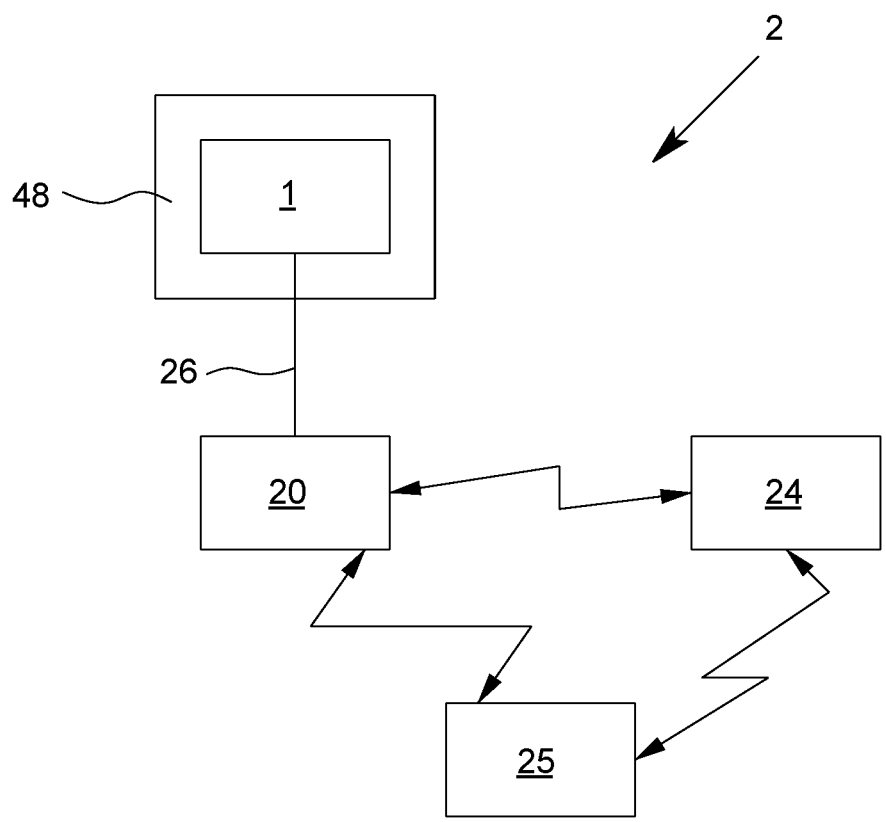
FIG. 31 is a schematic representation of a further embodiment of the cleaning device according to the invention.

FIG. 31 shows that the fan device 20 includes a control device 24. The control device 24 can reduce the electric power supplied to the fan device 20 from a energy supply device 25 to generate the negative pressure during the condition of the suction cleaning attachment 1 inserted into the quiver 48.

In particular, at least one pressure sensor can be assigned to the control device 24, which in particular measures and/or determines the pressure difference to be overcome. Provided that the suction cleaning attachment 1 is inserted into the quiver 48 and there is a pressure-tight seal between the outer edge 57 of the quiver 48 and the stop 49, the pressure difference in particular is very small. As a result, the electrical energy provided by the energy supply device 25 for the fan device 20 can be reduced.

In the operating state, however, there is a pressure difference to atmospheric pressure (approx. 1 bar) which ultimately ensures "suction operation". To provide the continuous suction air flow and the vacuum required for this purpose, the pressure difference is maintained, particularly in the operating state, and thus the electrical energy required for this purpose is also provided by the energy supply device 25.

The method for cleaning the interior of motor vehicles is not shown in the illustrated embodiments. In the method for cleaning the interior of motor vehicles, the cleaning device 1 explained above is used. For interior cleaning, dirt and/or particles are extracted in suction operation, and dirt and/or particles can be swirled up during suction operation in compressed air operation by means of a compressed air flow.

The compressed air mode can be switched on via switch 16. Thus, the process can be operated in a suction mode, a compressed air mode, a suction and compressed air mode and a suction mode with the compressed air mode being switched on as required. Particles that are difficult to access in particular can be swirled and/or stirred up by the compressed air flow and then sucked up via the suction air flow.

In this way, the process can be used to reliably remove dirt particles from areas of the interior of motor vehicles that are difficult to reach. In addition, the dirt particles can be removed from hard-to-reach areas and blown and/or transported into easy-to-reach areas by means of the compressed air flow. Subsequently, the dirt particles can be sucked up or removed from the easily accessible areas by the suction air flow.

LIST OF REFERENCE SIGNS

1 Suction cleaning attachment
2 Cleaning device
3 Suction channel
4 Housing
5 Compressed air channel
6 Compressed air opening
7 Suction opening
8 Handle section
9 Housing nozzle
10 End piece
11 Pipe section
12 Connection end
13 Handle section area
14 Handle area
15 Compressed air connection
16 Switch
17 Spring
18 Lighting device
19 Line
20 Fan device
21 Compressed air device
22 Compressed air reservoir
23 Compressed air generator
24 Control device
25 Energy supply device
26 Suction hose
27 Compressed air line
28 Line fastening means
29 Fastening means
30 Grooved leg of the suction hose
31 Side piece
32 Attachment
33 Channel
34 Light exit opening
35 Electrical connection line
36 Compressed air connection line
37 Twist lock
38 Exterior attachment
39 Reception area
40 Actuating means
41 Release means
42 Lock
43 Channel opening
44 Guide channel
45 Protrusion
46 Separator bar
47 Inner wall from 9
48 Quiver
49 Stop
50 Outer edge of 9
51 Swivel lever
52 Switch housing
53 Marking
54 Outer end of 3
55 Connection area from 8
56 Sloping 57 outer edge of 48
58 Webs from 44
59 Connection area from 9

The invention claimed is:

1. A suction cleaning attachment of a cleaning device for cleaning the interior of motor vehicles by means of a suction air flow, with a housing having a suction channel for guiding the suction air flow,
wherein, in addition to the suction channel, a compressed air channel for guiding a compressed air flow is provided in the housing and/or wherein, in addition to the suction channel, a compressed air channel for guiding a compressed air flow is associated with the housing, wherein a handle area is provided on the outside of the housing for gripping the suction cleaning attachment with one hand, wherein a switch is provided for controlling the compressed air flow and the switch is arranged at the handle area in such a way that the switch can be actuated by a hand encompassing the handle area with the same hand;
wherein the switch has a swivel lever which is pivotably mounted at its one end and whose other end is designed for switch actuation;
wherein the swivel lever is spring-loaded by at least one spring, wherein the swivel lever can be pivotable and/or displaceable from at least one blocking position blocking the compressed air flow into at least one release position releasing the compressed air flow and/or wherein the swivel lever can be pivoted and/or displaced from the release position into the blocking position by the spring force of the spring; and
wherein the spring is at least indirectly connected to an actuating means in such a way that the actuating means is designed to rotate a release means upon pivoting and/or displacement of the swivel lever from the locked position into the release position and/or from pivoting and/or displacement from the release position into the locked position.

2. The suction cleaning attachment according to claim 1, wherein the release means is designed as an eccentric disc.

3. The suction cleaning attachment according to claim 1, wherein the release means cooperates with a lock, wherein the lock is displaceably mounted in a guide channel having a channel opening and/or wherein the compressed air present in the guide channel is blocked in the blocking position of the swivel lever by the lock closing the channel opening.

4. The suction cleaning attachment according to claim 3, wherein, in the release position of the swivel lever, the lock has been displaced by the release means in such a way that the compressed air can be guided through the channel opening of the guide channel into the compressed air channel.

5. The suction cleaning attachment according to claim 3, wherein the release means has at least one protrusion which is designed in such a way that the lock is displaceable towards the opening of the channel opening of the guide channel.

6. The suction cleaning attachment according to claim 1, wherein the swivel lever can be pivoted and/or displaced in two opposite directions into a respective release position starting from the locked position.

7. The suction cleaning attachment according to claim 1, wherein the switch is arranged at the end of the handle area facing away from the suction opening of the suction cleaning attachment.

8. The suction cleaning attachment according to claim 1, wherein the other, free end of the swivel lever projects into a handle section area of the handle area.

9. The suction cleaning attachment according to claim 1, wherein the cross-sectional area of the compressed air opening of the compressed-air channel is between 0.5 mm$^2$ to 200 mm$^2$, and/or wherein the cross-sectional area of the suction opening of the suction channel is between 100 mm$^2$ to 1000 mm$^2$, and/or wherein the ratio of the cross-sectional area of the suction opening to the cross-sectional area of the compressed air opening is between 10:1 to 100:1.

10. The suction cleaning attachment according to claim 1, wherein an overpressure between 5 to 10 bar is provided in the compressed air channel during the pressure operation and/or that wherein a negative pressure between 0.3 to 0.8 bar is provided in the suction channel during the suction operation.

11. The suction cleaning attachment according to claim 1, wherein the housing has a handle section comprising the handle area, a housing nozzle that can be detachably connected to the handle section, and an end piece that can be detachably connected to the housing nozzle.

12. The suction cleaning attachment according claim 11, wherein the suction channel and/or the compressed air channel is provided at least in sections in or on the handle section, in or on the housing nozzle and/or in or on the end piece.

13. The suction cleaning attachment according to claim 11, wherein the compressed air channel is arranged in the housing connecting piece and is separated at least in regions from the suction channel in the housing connecting piece by at least one separator bar, wherein the compressed air channel is adjacent to the inner wall of the housing nozzle and the separator bar is connected to the inner wall of the housing nozzle, and/or wherein the suction channel has a pipe section inserted into the housing nozzle, wherein the pipe section projects into the handle section and/or into the end piece.

14. The suction cleaning attachment according to claim 13, wherein the compressed air channel, which is designed as a compressed-air line, is held and/or arranged on the housing nozzle and/or on the pipe section, wherein the compressed air channel provided in the housing is designed to be valve-free.

15. The suction cleaning attachment according to claim 11, wherein the handle section has two outer connection ends and the handle section area is provided between the connection ends, the outer diameters of the connection ends each being larger than the outer diameter of the handle section area, in particular wherein the handle section area has a corrugation and/or a structured surface on the outside.

16. The suction cleaning attachment according to claim 11, wherein a stop designed as a step or a stop projecting beyond the handle area is provided on the outside of the housing between the suction opening and the handle area for cooperation with the outer edge of a quiver.

17. The suction cleaning attachment according to claim 13, wherein a lighting device is arranged on at least one of the pipe section, the end piece, the handle section, the housing nozzle, facing the end piece, and/or on the housing nozzle, wherein at least one line for conducting current is connected to the lighting device and is arranged and/or held on the inside of the housing nozzle, on the outside of the pipe section and/or on the inside of the end piece.

18. The suction cleaning attachment according to claim 13, wherein the material of at least one of the housing, the end piece, the housing nozzle, the pipe section, the handle section and/or the switch and/or the material of a guide channel comprises a plastic selected from the group consisting of polyethylene, polypropylene, polyvinyl chloride and/or polystyrene.

19. A cleaning device for cleaning the interior of motor vehicles, having a suction cleaning attachment according to claim 1, and having a fan device for generating a negative pressure and a compressed air device, the compressed air device being assigned to the compressed air channel of the suction cleaning attachment, and the fan device being assigned to the suction channel of the suction cleaning attachment.

20. The cleaning device according to claim 19, wherein a compressed air connection line connecting the suction cleaning attachment to the compressed air device and/or at least one electrical connection line, connecting the lighting device to an energy supply device, are connected via at least one fastening means to the suction hose connecting the suction cleaning attachment to the fan device wherein the fastening means is connected positively and/or latched to at least one grooved leg of the suction hose, and/or the fastening means being multipart and being designed to accommodate the compressed air connection line and the electrical connection line.

21. The cleaning device according to claim 20, wherein a quiver is designed in the shape of a hollow cylinder and is closed at the ends, wherein a stop of the suction cleaning attachment interacts with an outer edge of the quiver in such a way that a pressure-tight closure results.

* * * * *